(12) United States Patent
Carnevali

(10) Patent No.: US 7,849,630 B2
(45) Date of Patent: Dec. 14, 2010

(54) FISHING ROD HOLDER

(76) Inventor: Jeffrey D. Carnevali, 5957 Beach Dr. SW., Seattle, WA (US) 98136

(*) Notice: Subject to any disclaimer, the term of this patent is extended or adjusted under 35 U.S.C. 154(b) by 602 days.

(21) Appl. No.: 11/701,126

(22) Filed: Jan. 13, 2007

(65) Prior Publication Data
US 2008/0155881 A1 Jul. 3, 2008

(51) Int. Cl.
*A01K 97/10* (2006.01)
(52) U.S. Cl. ...................................................... 43/21.2
(58) Field of Classification Search ............... 248/74.1, 248/74.2, 74.4, 68.1, 316.1, 316.2, 62; 24/270, 24/16 R, 542; 43/21.2, 23
See application file for complete search history.

(56) References Cited

U.S. PATENT DOCUMENTS

| | | | |
|---|---|---|---|
| 420,592 A * | 2/1890 | Dayton | 248/514 |
| 1,963,463 A * | 6/1934 | Hammer | 248/515 |
| 2,200,183 A * | 5/1940 | Legg | 248/538 |
| 2,283,816 A * | 5/1942 | Loutrel | 43/23 |
| 2,599,160 A * | 6/1952 | Brauer | 248/515 |
| 2,626,770 A * | 1/1953 | Norman | 248/534 |
| 2,682,127 A * | 6/1954 | Binder | 43/21.2 |
| 2,887,287 A * | 5/1959 | Ross | 248/515 |
| 2,890,847 A * | 6/1959 | Minton et al. | 248/534 |
| 2,949,269 A * | 8/1960 | Kimura | 248/515 |
| 3,792,829 A * | 2/1974 | Fickett | 248/534 |
| 3,934,801 A | 1/1976 | Johnson | |
| 3,977,117 A | 8/1976 | Zahner | |
| 4,017,998 A | 4/1977 | Dumler | |
| D246,661 S | 12/1977 | Engblom | |
| 4,093,171 A | 6/1978 | Mengo, Sr. | |
| 4,124,190 A | 11/1978 | Wheeler | |
| 4,142,315 A | 3/1979 | Hoffman | |
| 4,142,316 A | 3/1979 | Greer et al. | |
| 4,150,506 A | 4/1979 | McGinnis et al. | |
| 4,154,015 A | 5/1979 | Holland | |
| 4,197,668 A | 4/1980 | McKinsey | |
| 4,198,775 A * | 4/1980 | Leisner | 43/21.2 |
| 4,202,125 A | 5/1980 | Kovacs | |
| 4,217,720 A | 8/1980 | Karr | |
| 4,235,409 A | 11/1980 | Cummings | |
| 4,245,419 A * | 1/1981 | McManus | 43/21.2 |
| 4,257,181 A | 3/1981 | Cooper | |
| 4,344,248 A | 8/1982 | Brophy, Sr. et al. | |
| 4,366,640 A | 1/1983 | Clapp | |
| 4,397,113 A | 8/1983 | Pinson | |

(Continued)

*Primary Examiner*—Michael Carone
*Assistant Examiner*—Jonathan C Weber
(74) *Attorney, Agent, or Firm*—Charles J. Rupnick, Attorney at Law

(57) ABSTRACT

A fishing rod holding device having a long U-shaped barrel with a longitudinal opening between a pair of opposing longitudinal walls, and a notch formed through an outer edge of each of the opposing longitudinal walls. A is bail structured to fit over the longitudinal opening between the pair of opposing longitudinal walls of the U-shaped barrel at least covering the wall notches and portions of the barrel on either side of the wall notches. A hinge mechanism is provided between the bail and the outer edge of a first one of the opposing longitudinal walls of the semi-tubular barrel for swinging the bail over the longitudinal opening thereof, and a locking mechanism is provided between the bail and the outer edge of a second one of the opposing longitudinal walls for securing the bail relative to the semi-tubular barrel.

22 Claims, 19 Drawing Sheets

U.S. PATENT DOCUMENTS

| | | |
|---|---|---|
| 4,399,630 A | 8/1983 | Laws |
| 4,407,089 A | 10/1983 | Miller |
| 4,455,779 A | 6/1984 | Cosic |
| 4,468,878 A | 9/1984 | Maher |
| 4,471,553 A | 9/1984 | Copeland |
| 4,510,709 A | 4/1985 | Melcher |
| 4,517,761 A | 5/1985 | Bleggi |
| 4,528,768 A | 7/1985 | Anderson |
| 4,541,196 A | 9/1985 | Jershin |
| 4,550,519 A | 11/1985 | Simmons et al. |
| 4,581,838 A | 4/1986 | Moon |
| 4,586,688 A * | 5/1986 | Hartman et al. ............. 248/538 |
| 4,594,805 A | 6/1986 | McClelland |
| 4,614,323 A | 9/1986 | Bauer |
| 4,635,390 A * | 1/1987 | Walters ....................... 43/21.2 |
| 4,640,038 A | 2/1987 | Jershin |
| 4,641,453 A | 2/1987 | Roberts, Sr. |
| 4,650,146 A | 3/1987 | Duke |
| 4,674,222 A | 6/1987 | Hughes |
| 4,676,018 A | 6/1987 | Kimball |
| 4,676,019 A | 6/1987 | Engles |
| 4,730,408 A | 3/1988 | Miller |
| 4,763,435 A | 8/1988 | Deering |
| 4,765,083 A | 8/1988 | Wilkins |
| 4,778,141 A | 10/1988 | Bogar |
| 4,783,029 A * | 11/1988 | Geppert et al. ............. 248/74.1 |
| 4,793,086 A | 12/1988 | Cup |
| 4,831,763 A | 5/1989 | Alcorn |
| 4,852,290 A | 8/1989 | Wallace et al. |
| 4,877,165 A | 10/1989 | Behrle |
| D307,170 S | 4/1990 | Scott |
| 4,919,316 A | 4/1990 | Grauberger |
| 4,932,152 A | 6/1990 | Barlotta et al. |
| 5,009,027 A | 4/1991 | Lee |
| 5,025,584 A | 6/1991 | Butterwick, Sr. |
| 5,033,223 A | 7/1991 | Minter |
| 5,054,229 A | 10/1991 | Hughes |
| 5,068,996 A | 12/1991 | Shank |
| 5,088,224 A | 2/1992 | Gutierrez |
| 5,105,574 A | 4/1992 | Fast |
| D330,753 S | 11/1992 | Gutierrez |
| 5,163,244 A | 11/1992 | Rupp |
| 5,184,797 A | 2/1993 | Hurner |
| 5,187,891 A * | 2/1993 | Stanishewski ............... 43/21.2 |
| 5,231,785 A | 8/1993 | Roberts |
| D345,409 S | 3/1994 | Baynard |
| 5,295,321 A | 3/1994 | Matura |
| 5,313,734 A * | 5/1994 | Roberts ....................... 43/21.2 |
| 5,335,440 A | 8/1994 | Williams |
| 5,341,589 A | 8/1994 | Gutierrez |
| 5,359,802 A | 11/1994 | Gutierrez |
| 5,365,689 A | 11/1994 | Holliman |
| 5,435,473 A | 7/1995 | Larkum |
| 5,437,122 A | 8/1995 | Wilson |
| 5,438,789 A | 8/1995 | Emory |
| 5,446,989 A | 9/1995 | Stange et al. |
| 5,460,306 A | 10/1995 | Rudd |
| D365,870 S | 1/1996 | Miller |
| D366,091 S | 1/1996 | Delekta et al. |
| 5,501,028 A | 3/1996 | Hull et al. |
| 5,519,959 A | 5/1996 | Cross |
| 5,557,876 A | 9/1996 | Parker |
| 5,557,877 A | 9/1996 | Colson |
| 5,561,937 A | 10/1996 | Johnson |
| 5,571,228 A | 11/1996 | McMurtrie |
| 5,632,112 A | 5/1997 | Steinborn |
| 5,632,427 A | 5/1997 | Gattuso et al. |
| D386,557 S | 11/1997 | Thompson |
| D388,153 S | 12/1997 | Snyder |
| 5,724,763 A | 3/1998 | Rasmussen |
| 5,761,844 A | 6/1998 | Horschel |
| 5,845,891 A | 12/1998 | West |
| 5,855,087 A | 1/1999 | Risinger |
| 5,871,196 A | 2/1999 | Martelli |
| 5,873,191 A | 2/1999 | Bova et al. |
| D407,137 S | 3/1999 | Thompson |
| 5,937,567 A | 8/1999 | Elkins |
| 5,975,479 A | 11/1999 | Suter |
| 5,987,801 A | 11/1999 | Anderson |
| 5,987,804 A | 11/1999 | Shearer et al. |
| 5,992,081 A | 11/1999 | Elkins |
| 5,996,958 A | 12/1999 | Baynard et al. |
| 6,003,746 A | 12/1999 | Richardson |
| 6,052,937 A | 4/2000 | Morong |
| 6,094,851 A | 8/2000 | Guidry |
| 6,112,449 A | 9/2000 | Blackwell |
| D443,020 S | 5/2001 | Ratza et al. |
| D447,213 S | 8/2001 | Rossman |
| 6,269,584 B1 * | 8/2001 | Peaschek .................... 43/21.2 |
| 6,301,820 B1 | 10/2001 | Rosa |
| 6,302,367 B1 | 10/2001 | Ratza et al. |
| 6,318,017 B1 | 11/2001 | Genardo |
| 6,363,650 B1 | 4/2002 | Beeler |
| 6,381,897 B1 | 5/2002 | Walsh |
| D460,144 S | 7/2002 | Huy, Jr. |
| 6,421,948 B1 | 7/2002 | Craig |
| 6,427,376 B1 | 8/2002 | Weber |
| 6,430,864 B1 | 8/2002 | Thomure et al. |
| 6,484,433 B1 | 11/2002 | Greene |
| 6,487,813 B2 | 12/2002 | Baynard et al. |
| 6,499,248 B2 | 12/2002 | Thompson |
| 6,561,471 B1 * | 5/2003 | Hawie ........................ 248/201 |
| 6,561,476 B2 * | 5/2003 | Carnevali ............... 248/288.31 |
| 6,568,122 B1 | 5/2003 | Smith |
| 6,571,507 B2 * | 6/2003 | Elford ........................ 43/21.2 |
| 6,584,723 B2 * | 7/2003 | Elmore ........................ 43/4.5 |
| 6,594,941 B1 | 7/2003 | Anderson |
| 6,626,409 B1 | 9/2003 | Thompson |
| 6,637,146 B2 | 10/2003 | Ernst |
| 6,651,374 B1 | 11/2003 | Ridlen |
| 6,681,517 B1 | 1/2004 | Solomon |
| 6,718,682 B1 | 4/2004 | Seitsinger et al. |
| 6,802,150 B2 | 10/2004 | Harden |
| 6,941,694 B2 | 9/2005 | Ernst |
| 6,974,113 B1 | 12/2005 | Clark et al. |
| 7,017,296 B2 | 3/2006 | Templeman et al. |
| D523,109 S | 6/2006 | Palmer, Jr. |
| D525,675 S | 7/2006 | Munn |
| 7,086,194 B1 | 8/2006 | Troyer, Jr. |
| 7,086,195 B2 | 8/2006 | Borgeat |
| 7,089,699 B2 | 8/2006 | Borgeat |
| 7,114,281 B2 | 10/2006 | Miller |
| 7,131,232 B1 | 11/2006 | Fecht |
| 7,406,795 B1 * | 8/2008 | Follmar ....................... 43/21.2 |
| 2002/0023996 A1 | 2/2002 | Kondash |
| 2002/0043014 A1 | 4/2002 | Kondash |
| 2002/0116860 A1 | 8/2002 | Ernst |
| 2003/0089021 A1 | 5/2003 | Miller |
| 2003/0217500 A1 | 11/2003 | Ernst |
| 2004/0025404 A1 | 2/2004 | Thompson |
| 2004/0144016 A1 | 7/2004 | Harden |
| 2006/0064919 A1 | 3/2006 | Fulop |
| 2006/0137236 A1 | 6/2006 | Diederichs |
| 2006/0254118 A1 | 11/2006 | Warecke |

* cited by examiner

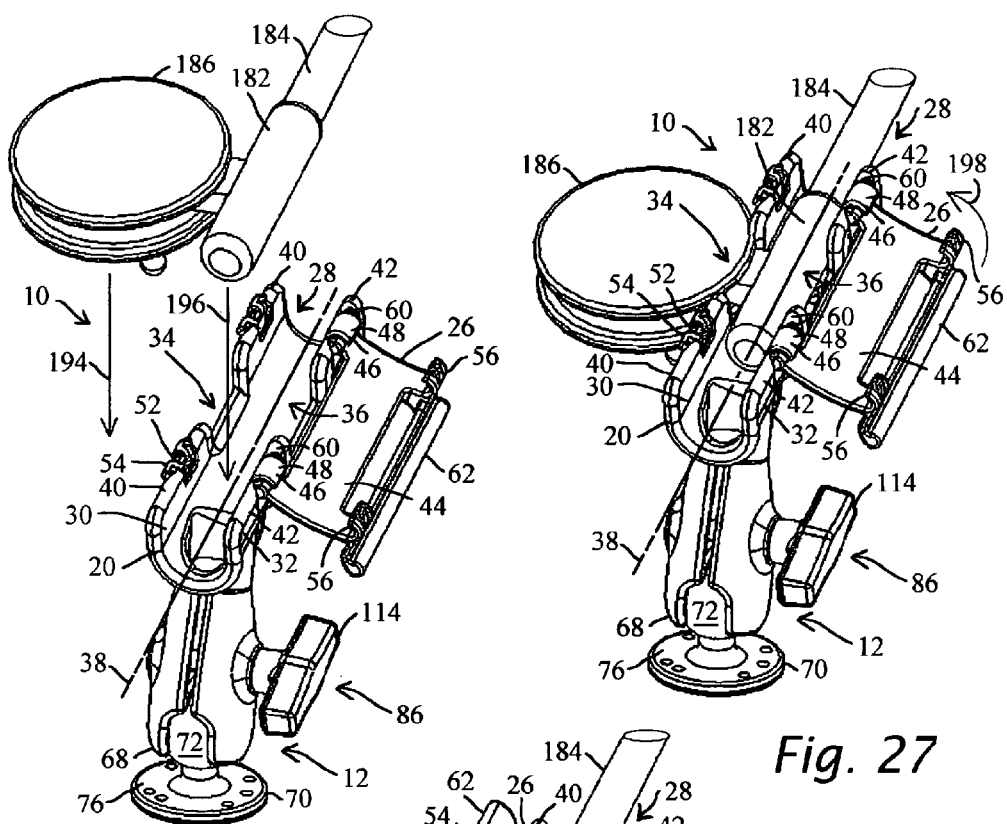
Fig. 26
Fig. 27
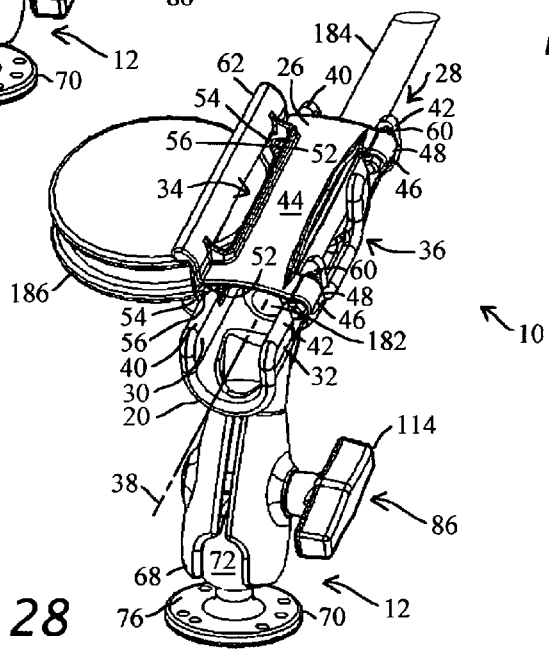
Fig. 28

FISHING ROD HOLDER

RELATED APPLICATIONS

The present application is related to and claims priority benefit of co-pending U.S. Design Pat. application Ser. No. 29/270,802 previously filed in the name of the inventor of the present invention on Jan. 2, 2007, which is incorporated in its entirety herein by reference.

FIELD OF THE INVENTION

The present invention relates to the field of fishing rod holding devices, and in particular to universal fishing rod holding devices having a quick release mechanism.

BACKGROUND OF THE INVENTION

Fishing rod holding devices are generally well-known and commonly used to relieve strain from a person engaged in fishing by supporting a fishing rod by its handle until such time as a fish is hooked on the line. Thereafter, the fishing rod holder must permit the person to remove the fishing rod from the holder to personally "play" and reel-in the fish.

One problem with known fishing rod holding is they are generally not able to release the fishing rod handle in a quick and efficient manner.

SUMMARY OF THE INVENTION

The present invention overcomes limitations of the prior art by providing a novel fishing rod holding device that effectively holds a fishing rod and releases the fishing rod handle in a quick and efficient manner.

According to one aspect of the invention, in its broad aspect this novel fishing rod holding device includes a long U-shaped barrel having a longitudinal opening between a pair of opposing longitudinal walls, and a notch formed through an outer edge of each of the opposing longitudinal walls; a bail structured to fit over the longitudinal opening between the pair of opposing longitudinal walls of the U-shaped barrel at least covering the wall notches and portions of the barrel on either side of the wall notches; a hinge mechanism structured between the bail and the outer edge of a first one of the opposing longitudinal walls of the semi-tubular barrel for swinging the bail over the longitudinal opening thereof; and a locking mechanism structured between the bail and the outer edge of a second one of the opposing longitudinal walls for securing the bail relative to the semi-tubular barrel.

According to another aspect of the invention, the hinge mechanism and locking mechanism of the fishing rod holding device are both further structured to be reversible relative to the outer edges of the respective first and second opposing longitudinal walls.

By example and without limitation, the hinge mechanism of the fishing rod holding device further includes a pair of hooks spaced apart along an edge of the bail, the pair of hooks being structured to releasably engage a pair of hinge pins on the outer edge of the barrel's first longitudinal wall and spaced on either side of the wall notch thereof.

By example and without limitation, the locking mechanism of the fishing rod holding device further includes a pair of lips spaced apart along an edge of the bail, the pair of lips being structured to releasably engage a pair of catch pins on the outer edge of the barrel's second longitudinal wall and spaced on either side of the wall notch thereof.

By example and without limitation, the pair of catch pins on the outer edge of the barrel's second longitudinal wall are further substantially identical to the pair of hinge pins on the outer edge of the barrel's first longitudinal wall in size, shape and position relative to the respective wall notches.

According to another aspect of the invention, the fishing rod holding device further includes a mounting structure having a ball-and-socket joint at a first end thereof and a second end thereof being joined to the U-shaped barrel. Optionally, the fishing rod holding device further includes a support structure coupled between the mounting structure and the U-shaped barrel. According to another aspect of the invention, the support structure is further structured having the size and shape of a trigger guard to admit a digit between the mounting structure and the U-shaped barrel.

According to yet another aspect of the invention, in its broad aspect a novel method for holding a fishing rod in a fishing rod holding device is provided, wherein the method includes, in a long barrel forming a longitudinal U-shaped opening between first and second opposing longitudinal walls thereof with each being formed with an opposing notch through an outer edge thereof, initially rotating a bail relative to the first one of the longitudinal walls for exposing the longitudinal opening and the notch of the second wall; positioning a handle of a spinning rod over the barrel's longitudinal opening and substantially aligning the handle with the longitudinal U-shaped opening; inserting the spinning rod handle into the longitudinal U-shaped opening; inserting the spinning reel into the exposed notch of the second wall; rotating the bail over the longitudinal U-shaped opening and the notch of the second wall; and engaging an over-center locking mechanism between the bail and the second wall of the barrel on either side of the notch therein.

According to another aspect of the method of the invention, initially rotating a bail relative to the first one of the longitudinal walls for exposing the longitudinal opening and the notch of the second wall further includes blocking the notch of the first wall with the bail.

According to another aspect of the method of the invention, engaging the over-center locking mechanism further includes engaging a pair of lips spaced apart along a first edge of the bail with respective catch pins on the second wall of the barrel on either side of the notch therein.

According to another aspect of the method of the invention, initially rotating a bail relative to the first one of the longitudinal walls further includes engaging a pair of semi-tubular hooks spaced apart along a second edge the bail with respective hinge pins on the first wall of the barrel on either side of the notch therein.

According to another aspect of the invention, the method further includes disengaging the over-center locking mechanism by exerting force on the bail adjacent to the first edge thereof external of the pair of spaced apart lips.

According to still another aspect of the invention, the method further includes disengaging the pair of semi-tubular hooks spaced apart along a second edge the bail from respective hinge pins on the first wall of the barrel; engaging the pair of semi-tubular hooks spaced apart along the second edge the bail with the respective catch pins on the second wall of the barrel on either side of the notch therein; rotating the bail relative to the second one of the longitudinal walls for exposing the longitudinal opening and the notch of the first wall; positioning the handle of the spinning rod over the barrel's longitudinal opening and substantially aligning the handle with the longitudinal U-shaped opening; inserting the spinning rod handle into the longitudinal U-shaped opening; inserting the spinning reel into the exposed notch of the first wall; rotating the bail relative to the second wall over the longitudinal U-shaped opening and the notch of the first wall; and engaging the over-center locking mechanism between the bail and the first wall of the barrel on either side of the notch therein by engaging the pair of lips spaced apart along the first edge of the bail with respective hinge pins on the first wall of the barrel on either side of the notch therein.

Other aspects and objects, features, and advantages of the invention will be apparent in the written description which follows.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIGS. 15, 16 and 17 illustrate an elongate flexible bail in different positions relative to the novel semi-tubular barrel of the novel fishing rod holder, wherein: FIG. 15 illustrates the bail being initially rotated to completely uncover a longitudinal opening along the entire length of the novel semi-tubular barrel so that the spinning rod can be inserted there; FIG. 16 illustrates the bail being rotated from the initial position into an interim position directly over the barrel's longitudinal opening prior to engagement of a locking mechanism for securing the bail relative to the barrel; and FIG. 17 illustrates the bail being rotated from the interim position into a securely latched position with the locking mechanism being positively engaged for securing the bail relative to the barrel;

FIG. 26 illustrates by example and without limitation the novel fishing rod holder with the bail being initially rotated in the reversed position to completely uncover the barrel's longitudinal opening from a second side thereof such that the barrel's longitudinal opening is unobstructed and a spinning rod can be inserted into the semi-tubular barrel;

FIG. 27 illustrates the novel fishing rod holder having the spinning rod inserted into the longitudinal opening of the semi-tubular barrel with its spinning reel inserted into an open notch in the barrel wall opposite from the reversed security bail; and FIG. 28 illustrates the novel fishing rod holder having the spinning rod inserted into the longitudinal opening of the semi-tubular barrel with the spinning reel inserted into the wall notch wherein the reversed security bail is shown rotated into position over the barrel's longitudinal opening with the locking mechanism securely engaged such that the security bail effectively secures the spinning rod against removal from the barrel of the rod holder even against a substantial lifting force exerted against the bail to pull the spinning rod out.

DETAILED DESCRIPTION OF PREFERRED EMBODIMENT

In the Figures, like numerals indicate like elements.

The terms "up" and "down" and "right" and "left" and derivatives are used solely for clarity in describing the invention and relate to the relative orientation of the individual components shown in the Figures and the assembly relative to a surface to which it is attached.

The present invention is a universal fishing rod holding device having a quick release mechanism able to release the fishing rod handle in a quick and efficient manner.

Figure 1:
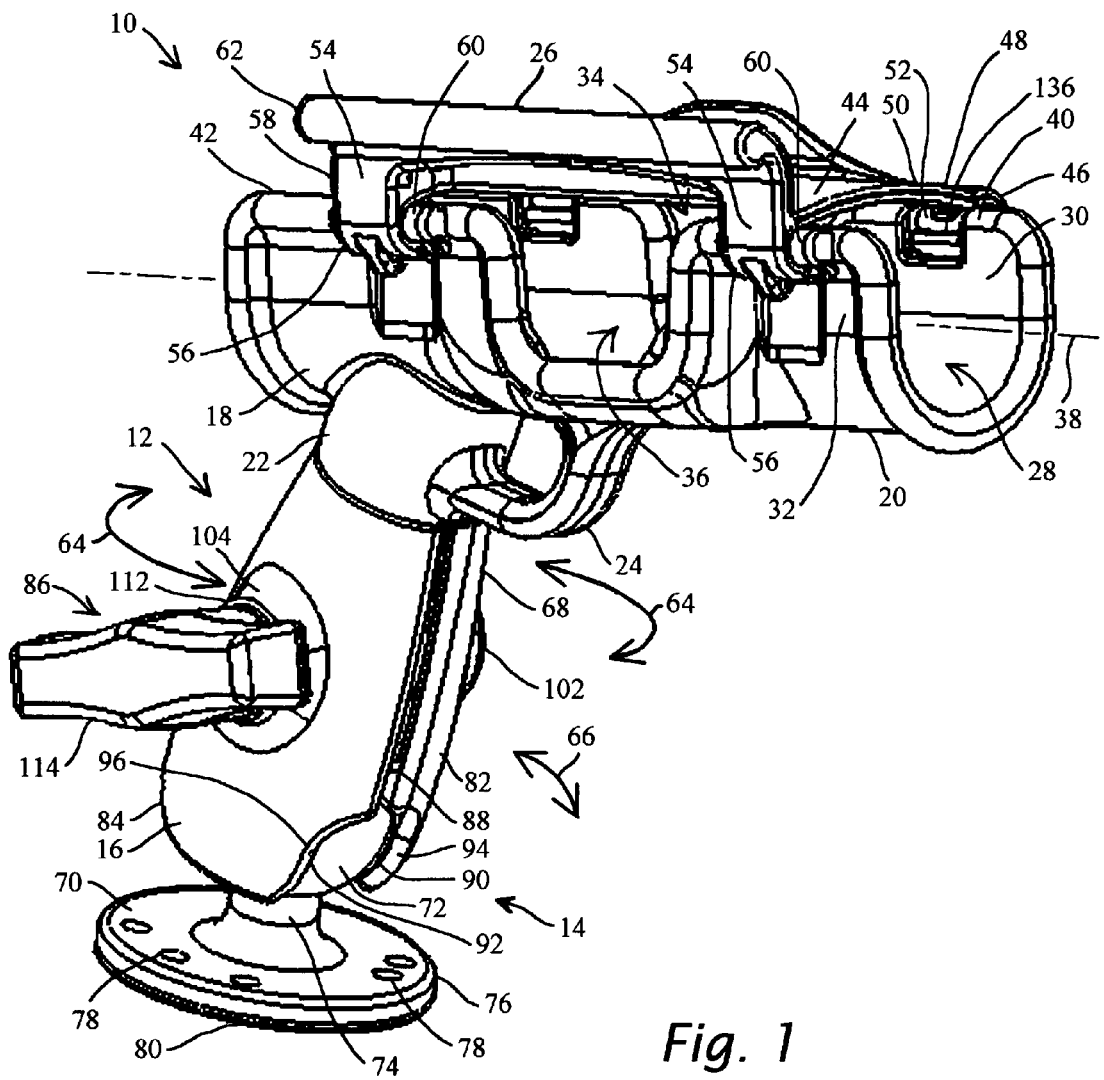
FIG. 1 is a front perspective view of a novel fishing rod holder from a first side.

FIG. 1 illustrates the fishing rod holder 10 by example and without limitation as having a pistol grip mounting structure 12 which includes an interlockable ball-and-socket joint mechanism 14 at a first end 16. A first end 18 of an elongated semi-tubular U-shaped barrel 20 is projected from a second bulb-shaped end 22 of the pistol grip mounting structure 12 with a trigger guard shaped support structure 24 extended between the pistol grip mounting structure 12 and the semi-tubular barrel 20. The trigger guard shaped support structure 24 is sized to admit at least one of a user's digits between the pistol grip mounting structure 12 and the semi-tubular barrel 20. A quick release latch 26 is rotatably structured for swinging over a longitudinal opening 28 between first and second opposing longitudinal walls 30 and 32 of the semi-tubular barrel 20 for retaining a spinning rod in the barrel 20 as will be described below.

The elongated semi-tubular barrel 20 of the fishing rod holder 10 includes first and second notches 34 and 36 formed crosswise of the barrel's longitudinal axis 38 through outer edges 40 and 42 of its first and second walls 30 and 32, respectively. The notches 34 and 36 are formed substantially intermediate of the elongated semi-tubular barrel 20 and are further structured to accommodate a spinning reel as will be described below.

The quick release latch 26 includes a thin and flexible elongate security gate or bail 44 that is rotatably suspended from the first wall 30 of the semi-tubular barrel 20 for swinging over the barrel's longitudinal opening 28. By example and without limitation, bail 44 is rotatably suspended by a reversible hinge mechanism 46. By example and without limitation, the hinge mechanism 46 includes a pair of semi-tubular hooks 48 spaced apart along a hinge edge 50 thereof. The semi-tubular hooks 48 rotatably engage a pair of integral hinge pins 52 on the outer edge 40 of the barrel's first wall 30 and spaced on either side of the wall notch 34.

The quick release latch 26 includes a reversible locking mechanism 54 that secures the bail 44 relative to the semi-tubular barrel 20 for securing the spinning rod against removal from the fishing rod holder 10 even against a substantial lifting force exerted on the spinning rod against the bail 44. By example and without limitation, the locking mechanism 54 is an over-center type locking mechanism. For example, the over-center type locking mechanism 54 includes a pair of curved lips 56 spaced apart along a catch edge 58 of the bail 44. Each of the of curved lips 56 engage a respective catch pin 60 protruding from the outer edge 42 of the opposing barrel wall 32 and spaced on either side of the wall notch 36. A handle 62 along the catch edge 58 is positioned for use to both secure and release the locking mechanism 54.

The elongated semi-tubular barrel 20 of the fishing rod holder 10 is both rotatable and pivotable on the interlockable ball-and-socket joint mechanism 14, as indicated by the arrows 64 and 66, respectively. The interlockable ball-and-socket joint mechanism 14 is disclosed here by example and without limitation as the interlockable ball-and-socket joint mechanism disclosed by Jeffrey D. Carnevali, the inventor of the present fishing rod holder 10, in U.S. Pat. No. 5,845,885, entitled "Universally Positionable Mounting Device," issued Dec. 8, 1998, the complete disclosure of which is incorporated herein by reference. Alternatively, the interlockable ball-and-socket joint mechanism 14 is disclosed here by example and without limitation as the interlockable ball-and-socket joint mechanism disclosed in U.S. Pat. No. 6,561,476, entitled "Positively-Positionable Mounting Apparatus," issued to Jeffrey D. Carnevali, the inventor of the present fishing rod holder 10, on May 13, 2003, the complete disclosure of which is incorporated herein by reference.

Figure 2:
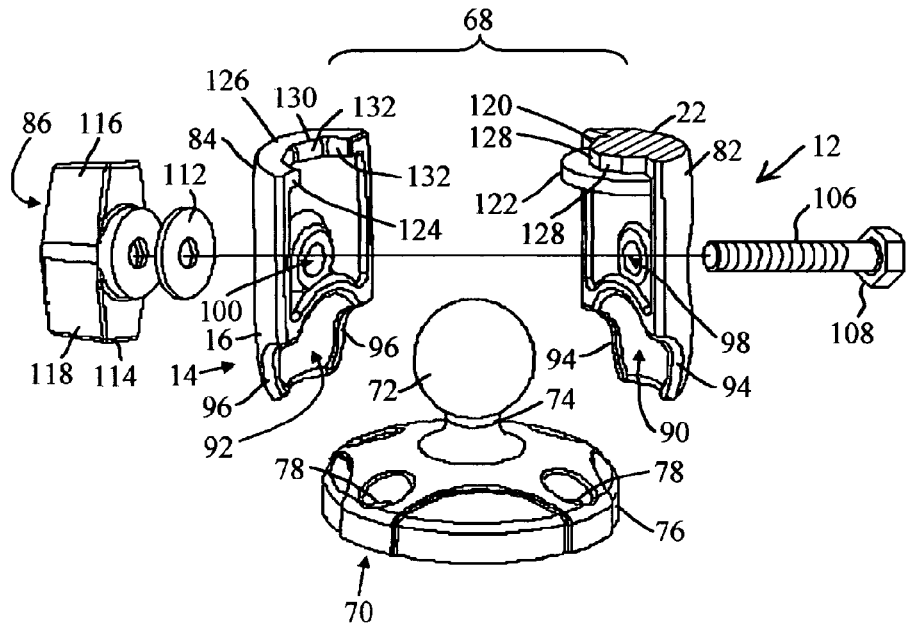
FIG. 2 is an exploded cross-section view taken through a novel pistol grip mounting structure of the novel fishing rod holder which illustrates one optional embodiment of an interlockable ball-and-socket joint mechanism thereof.

FIG. 2 is a cross-section view taken through the second end 22 of the pistol grip mounting structure 12 below the semi-tubular U-shaped barrel 20 shown in FIG. 1. Here, one optional embodiment of the interlockable ball-and-socket joint mechanism 14 is illustrated as being typical of the type disclosed by example and without limitation in U.S. Pat. No. 6,561,476, which is incorporated herein by reference. By example and without limitation, the interlockable ball-and-socket joint mechanism 14 is formed of a split arm assembly 68 with a ball-end mount or "coupler" 70 which is provided with a substantially smooth, part-spherical head 72 of a pressure deformable, resilient elastomeric material, which renders the part-spherical head 72 relatively resiliently radially compressible. The resiliently deformable part-spherical head 72 is extended on a reduced diameter stem or "neck" 74 relatively upstanding on a mounting flange 76, which is illustrated here by example and without limitation as being substantially disc-shaped. The mounting flange 76 is optionally formed with a quantity of mounting holes 78 for mounting on a ship's railing or other relatively stable surface by mechanical fasteners. Alternatively, the mounting flange 76 is mounted with an adhesive bond such as a resilient adhesive pad 80 (see, e.g., FIG. 1) of a type commonly known as a Pressure Sensitive Adhesive (PSA) applied between the mounting flange 76 and an external mounting surface. Other mounting devices, such as suction cups and clamps, are also contemplated and are considered equivalent structures and are substituted therefore without departing from the scope and intent of the invention.

The split arm assembly 68 is formed of a pair of elongated, relatively rigid arm sections 82 and 84 and a clamping mechanism 86 for squeezing together the pair of arm sections 82 and 84. A compression coil spring 88 (see, e.g., FIG. 4) may be positioned for biasing apart the pair of arm sections 82, 84. The split arm assembly 68 is clamped to the resiliently deformable part-spherical head 72 of the coupler 70 by the clamping mechanism 86 when the fishing rod holder 10 is rotationally and pivotally oriented as desired. The respective arm sections 82, 84 form a pair of operatively opposing first and second sockets 90 and 92 adjacent to the first end 16 of the ball-and-socket joint mechanism 14, the operatively opposing first and second sockets each having part-spherical surfaces at the inner peripheries thereof that cooperate with the part-spherical head 72 of the coupler 70 to interlock the fishing rod holder 10 in a desired rotational and pivotal orientation.

Optionally, cut-away indentations 94 and 96 are formed at respective rims of the first and second sockets 90 and 92. The cut-away indentations 94, 96 form a channel sized to pass the neck 74 supporting part-spherical head 72 of the coupler 70, thus maximizing the range of possible pivotal orientations.

The clamping mechanism 86 operates between the first and second ends 16 and 22 of the pistol grip mounting structure 12 through apertures 98 and 100 formed through the respective arm sections 82, 84 at the center of respective rounded bosses or lands 102, 104 (see, e.g., FIG. 4) exterior of the first and second arm sections 82, 84.

By example and without limitation, the clamping mechanism 86 is formed of a bolt 106 with an elongated shank that is inserted through the apertures 98, 100 of arm sections 82, 84. A hexagonal head 108 at one end is seated in a mating hexagonal counter-bore 110 of one arm section 82 (see, e.g., FIG. 5), which retains the bolt 106 against rotation. A threaded shank portion of the bolt 106 extends from the aperture 100 in the second arm section 84 and is engaged by a washer 112 and an internally threaded knob 114 with diametrically opposing wings 116 and 118 for operation as a wing nut. The knob 114 and the bolt 106 function as the clamping mechanism 86, in that the pair of arm sections 82, 84 are squeezed together along the longitudinal axis of the bolt 106 against the bias of the compression spring 88 by threading the knob 114 relatively inwardly along the length of the threaded shank portion in the direction of the bolt head 108. The pair of arm sections 82, 84 are allowed to separate from one another by unthreading the knob 114 along the shank portion of the bolt 106 in the opposite direction, to allow the bias of the compressed part-spherical head 72 of the coupler 70 and the compression spring 88, if present, to separate the pair of arm sections 82, 84 from one another.

The compression coil spring 88, if present, may be interposed between the arm sections 82, 84 between the clamping mechanism 86 and the first and second sockets 90, 92 adjacent to the first end 16 of the ball-and-socket joint mechanism 14. An eccentricity of the spring 88 with respect to the bolt 106 caused by the positioning of the spring 88 results a differential in the reaction of the arm sections 82, 84 to the clamping forces generated by the clamping mechanism 86. The differential in the reaction of the arm sections 82, 84 to the clamping forces of the clamping mechanism 86 caused by the spring 88 preferentially releases the compression forces on the part-spherical head 72 of the coupler 70 when the clamping mechanism 86 is released. The fishing rod holder 10 is rotationally and pivotally reoriented as desired, and the clamping mechanism 86 is operated to secure the new orientation.

The pressure deformable material of which the part-spherical head 72 of the coupler 70 is composed permits its part-spherical shape to be deformed to conform to the internal contours of the operatively opposing sockets 90, 92 of the respective arm sections 82, 84 when sufficient compressive pressure is applied. The pressure is applied by the threaded clamping mechanism 86. The resilient nature of the material causes the part-spherical head 72 to resume its original part spherically-shaped configuration when the clamping mechanism 86 is released, whereby the compressive pressure is removed.

A first one of the rigid arm sections 82 (shown here by example and without limitation) of the novel pistol grip mounting structure 12 is optionally made integral with the barrel 20 of the novel fishing rod holder 10. Here, as disclosed by Carnevali in U.S. Pat. Nos. 5,845,885 and 6,561,476, which are incorporated herein by reference, the first one of the rigid arm sections 82 (shown here by example and without limitation) at the second end 22 of the novel pistol grip mounting structure 12 of the novel fishing rod holder 10 is illustrated by example and without limitation as having a partial multisided stem or axle portion 120 formed at one end with a partial disc-shaped button or wheel portion 122. The other arm member 84 is optionally hollow except for its functional features. One functional feature is a collar 124 formed in an end face 126 of the second arm member 84. The collar 124 mates with both the partial multisided axle portion 120 disc-shaped wheel portion 122 of the first arm section 82. For example, the partial axle portion 120 is formed with a convex polygon shape, having multiple flat or planar wall surfaces 128. The collar 124 is formed with a convex polygon-shaped aperture 130 formed in the end face 126 of the arm section 84. The convex polygon-shaped aperture 130 is provided by multiple substantially planar interior wall surfaces 132 that are structured to mate with the planar surfaces 128 of the axle portion 120. Thus, each wall surface 132 is rotated from the adjacent wall surfaces at an angle substantially equal to that of angles between the planar surfaces 128 of the axle portion 120.

The axle portion 120 is long enough to ensure that the collar 124 obtains a suitable grip between the wheel portion 122 and the outer surface of the end face 126 of the arm section 84. The disc-shaped wheel portion 122 is sufficiently thick to support at least a minimum predetermined load applied to the part-spherical head 72 of the coupler 70 when the clamping mechanism 86 is engaged.

Figure 3:
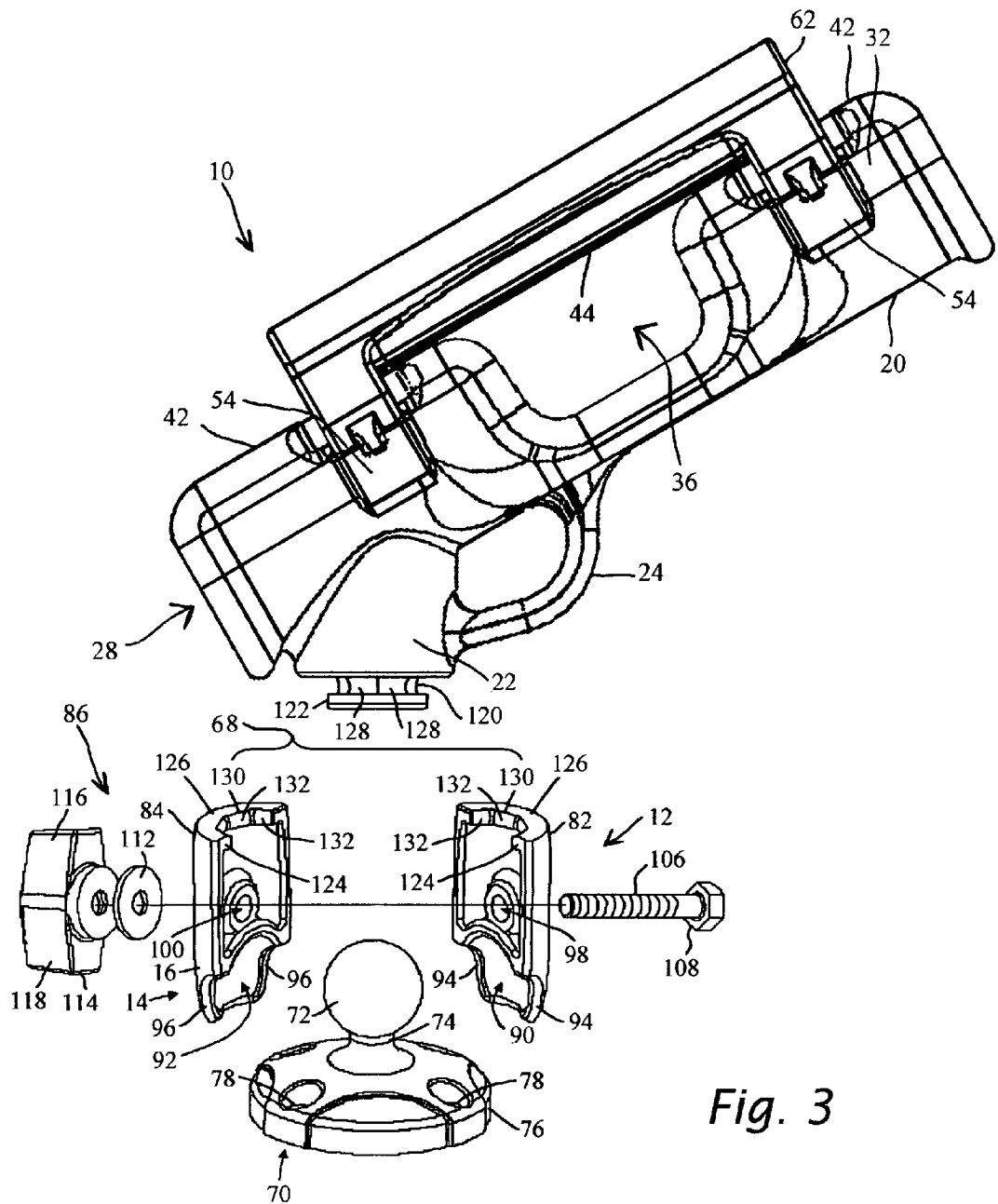
FIG. 3 is another exploded cross-section view taken through a novel pistol grip mounting structure of the novel fishing rod holder which illustrates another optional embodiment of an interlockable ball-and-socket joint mechanism thereof.

FIG. 3 illustrates an alternative embodiment wherein the second bulb-shaped end 22 of the pistol grip mounting structure 12 is instead formed on the first end 18 of the elongated U-shaped barrel 20. The multisided stem or axle portion 120 and disc-shaped button or wheel portion 122 are formed at the end 22 of the U-shaped barrel 20. The arm sections 82 and 84 are both formed independently of the U-shaped barrel 20. Each of the independent arm sections 82 and 84 are formed with the feature is a collar 124 formed in an end face 126 thereof, as disclosed by Carnevali in U.S. Pat. No. 6,561,476, which is incorporated herein by reference.

Operation of the clamping mechanism 86 both engages the first and second sockets 90, 92 of the independent arm sections 82 and 84 with the part-spherical head 72 of the coupler 70, and substantially simultaneously engages the collars 124 with the multisided stem or axle portion 120 and disc-shaped button or wheel portion 122 are formed at the end 22 of the U-shaped barrel 20.

The multiple interior wall surfaces 132 of the convex polygon-shaped aperture 130 can engage the wall surfaces 128 of the axle portion 120 in any of a large number of discrete rotational orientations. Accordingly, the collars 124 permit the U-shaped barrel 20 to rotate about the independent arm sections 82 and 84 of the pistol grip mounting structure 12 into any of the discrete rotational orientations relative to the knob 114 of the clamping mechanism 86. Thus, the knob 114 can be switched to either side of the trigger guard shaped support structure 24 for either left or right hand operation.

Figure 4:
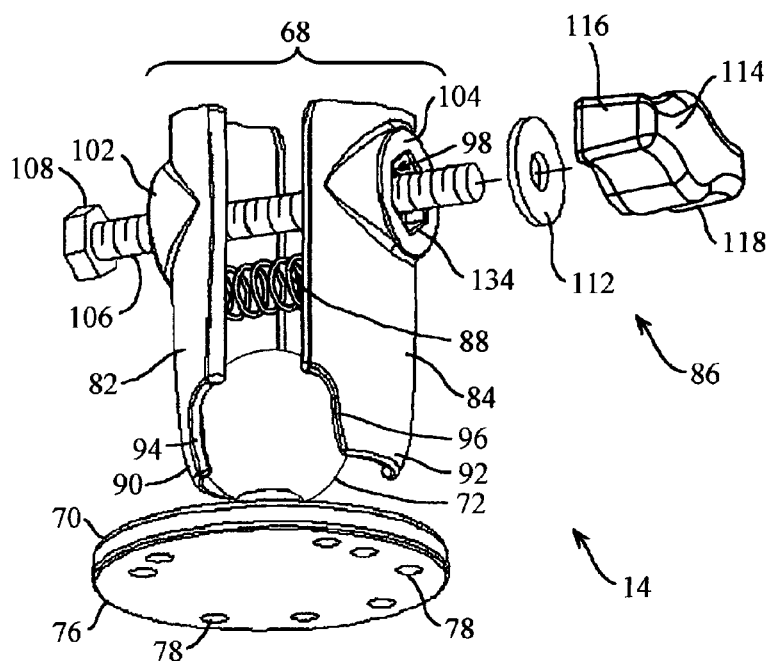
FIG. 4 is another exploded cross-section view taken through a novel pistol grip mounting structure of the novel fishing rod holder which illustrates by example and without limitation a reversible clamping mechanism of the novel fishing rod holder.

FIG. 4 illustrates by example and without limitation the clamping mechanism 86 showing the first arm section 82. Here, the aperture 100 is shown having a hexagonal counter-bore 134 formed in the boss 102. Optionally, the counter-bore 134 is substantially identical to the counter-bore 110 in the formed in the boss 104 of the second arm section 84. Thus, first and second arm sections 82 and 84 are substantially identical as to the respective apertures 98, 100, bosses 102, 104, and hexagonal counter-bores 110, 134. The clamping mechanism 86 is thus reversible. In opposition to FIG. 1, here the bolt 106 is installed instead through the aperture 100 in the second arm section 84, then through the aperture 98 in the first arm section 82 and coupled with the washer 112 and internally threaded knob 114 on the other side of the first arm section 82. The bolt's hexagonal head 108 mates with the hexagonal counter-bore 134 in the second arm section 84 which retains the bolt 106 against rotation. Accordingly, the clamping mechanism 86 is thus structured to be reversible, whereby the structure of the fishing rod holder 10 is thus rendered reversible. Thus, the knob 114 can be switched to either side of the trigger guard shaped support structure 24 for either left or right hand operation.

Figure 5:
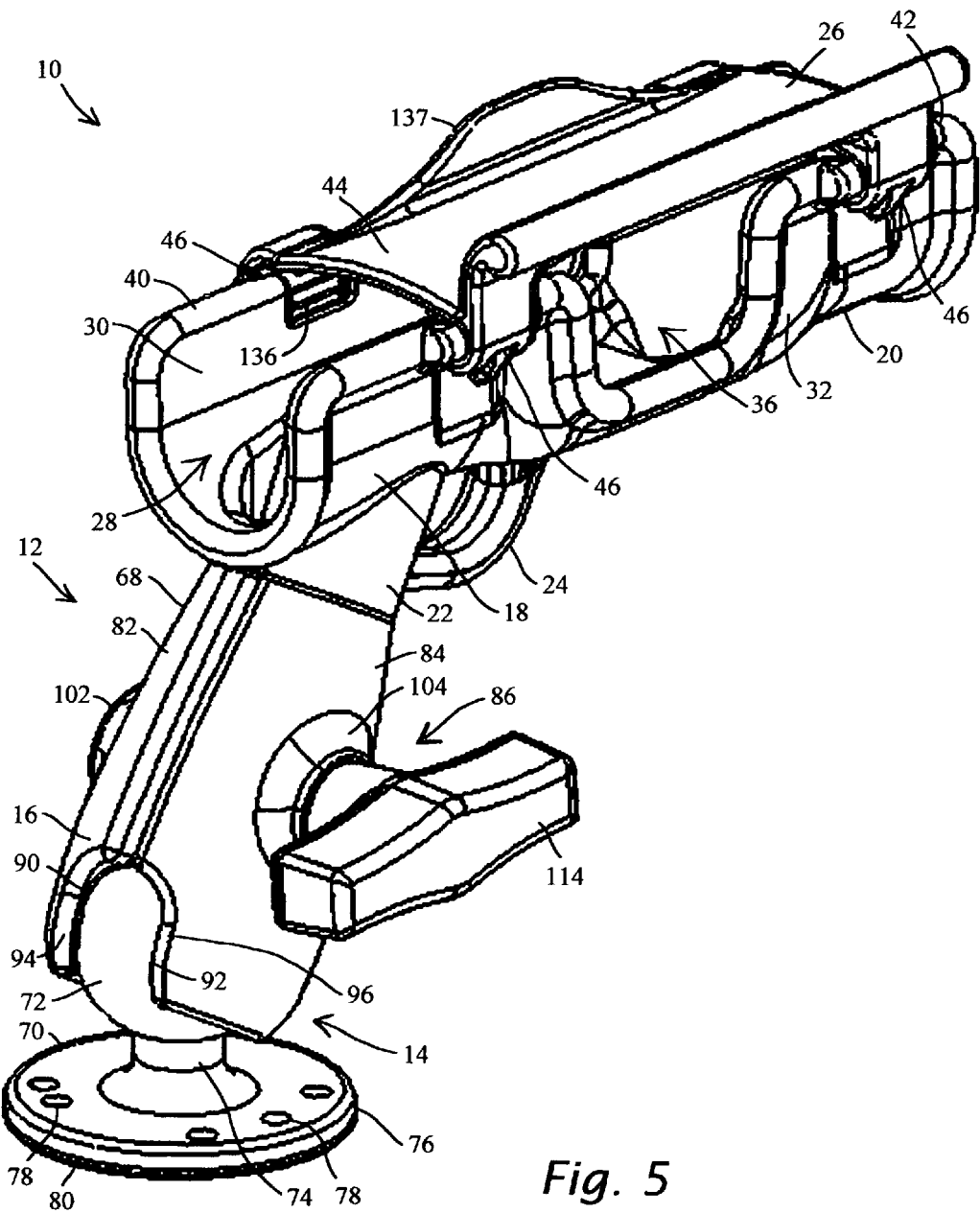
FIG. 5 is a front perspective view of the novel fishing rod holder from a second side.

FIG. 5 illustrates the fishing rod holder's quick release latch 26 from the hinge side. Here, the pair of semi-tubular hooks 48 of the hinge mechanism 46 are shown as being spaced apart along the hinge edge 50 of the security bail 44. The pair of semi-tubular hooks 48 engage the pair of integral hinge pins 52 spaced on either side of the notch 34 in the wall 30 of the semi-tubular barrel 20 for swinging over the barrel's longitudinal opening 28.

As illustrated here by example and without limitation, the hooks 48 of the hinge mechanism 46 are structured to fit over the hinge pins 52. By example and without limitation, the bail 44 is formed of a substantially flexible material, such as plastic, whereby the hooks 48 may be flexed to slightly open a mouth 136 thereof to pass over the hinge pin 52, whereby the hooks 48 are made removable from the hinge pins 52. After removal from the hinge pins 52, the mouths 136 of the hooks 48 may be again opened slightly and the hooks 48 re-installed on the first wall 30 of the semi-tubular barrel 20 for swinging over the barrel's longitudinal opening 28 from a first or left side of the fishing rod holder 10.

By example and without limitation, the hinge pins 52 adjacent to the edge 40 of the first wall 30 of the semi-tubular barrel 20 are optionally substantially identical to the catch pins 60 protruding from the edge 42 of opposing barrel wall 32 in size, shape and placement relative to the opposing crosswise wall notches 34, 36. Accordingly, the hooks 48 are optionally installed onto the catch pins 60 adjacent to the edge 42 of the second wall 32 of the semi-tubular barrel 20. The catch pins 60 thereafter operate as substitutes for the hinge pins 52 of the reversible hinge mechanism 46. Thus, as illustrated in subsequent figures, the hooks 48 may be alternatively installed on the second wall 32 of the semi-tubular barrel 20 for swinging over the barrel's longitudinal opening 28 from a second or right side of the fishing rod holder 10. The bail 44 is secured by the reversible locking mechanism 54. The curved lips 56 are engaged with the substantially identical hinge pins 52 protruding from the first barrel wall 30, which thereafter operate as substitutes for the catch pins 60. The fishing rod holder 10 is thus structured to be reversible, with the locking mechanism 54 and hinge mechanism 46 both also being structured to be reversible.

Here also, the flexible bail 44 is illustrated by example and without limitation as having a stiffener 137 formed along the hinge edge 50 between the spaced-apart hooks 48. The handle 62 operates as stiffener between the lips 56 on the opposite catch edge 58 of the flexible bail 44.

FIG. 5 also illustrates by example and without limitation the bolt 106 of the clamping mechanism 86 having the hexagonal head 108 at one end that is seated in the mating hexagonal counter-bore 110 of the arm section 82, which retains the bolt 106 against rotation.

Figure 6:
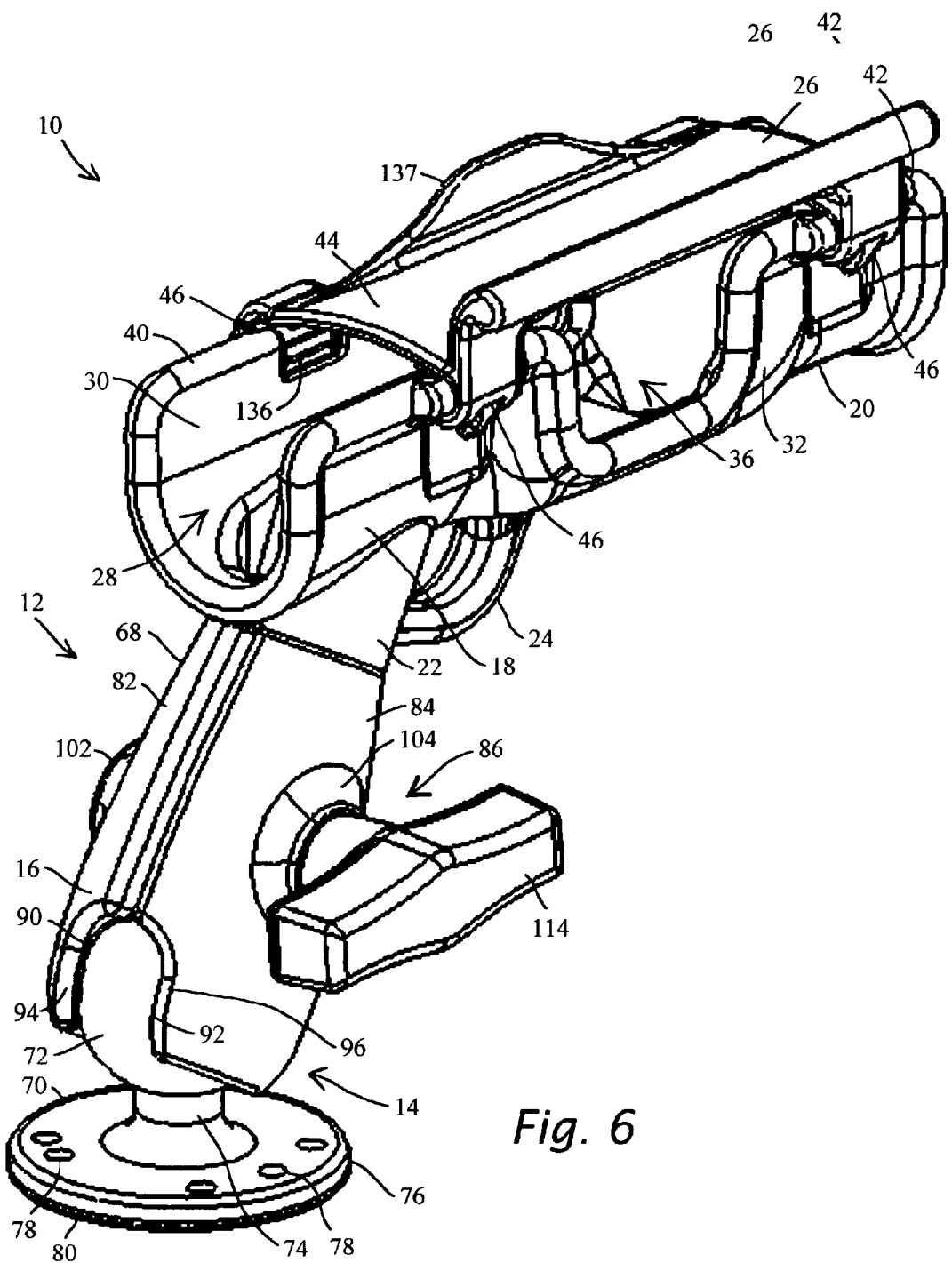
FIG. 6 is a rear perspective view of the novel fishing rod holder from a first side.

FIG. 6 is another view of the fishing rod holder 10 that illustrates by example and without limitation the longitudinal opening 28 extending the entire length of the elongated semi-tubular barrel 20 between its first and second opposing longitudinal walls 30 and 32.

Here, the arm sections 82, 84 of the split arm assembly 68 are illustrated by example and without limitation as including the respective cut-away indentations 94 and 96 formed at respective rims of the first and second sockets 90, 92. The cut-away indentations 94, 96 form a channel sized to pass the neck 74 supporting part-spherical head 72 of the coupler 70, thus maximizing the range of possible pivotal orientations as indicated by the arrow 66.

Figure 7:
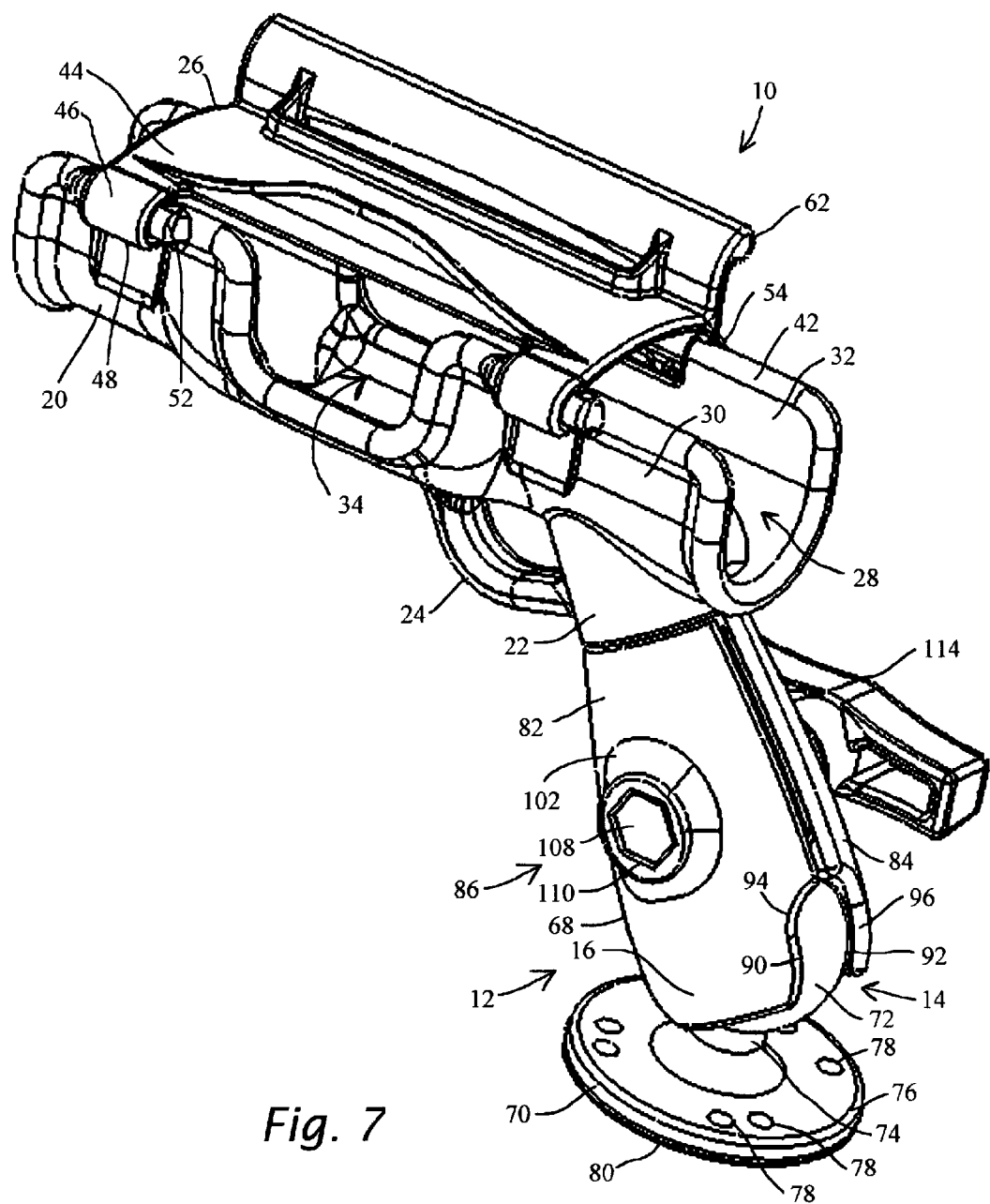
FIG. 7 is a rear perspective view of the novel fishing rod holder from a second side.

FIG. 7 is another view of the fishing rod holder 10 opposite from FIG. 6 that also illustrates by example and without limitation the longitudinal opening 28 extending the entire length of the elongated semi-tubular barrel 20 between its first and second opposing longitudinal walls 30 and 32.

Here, the arm sections 82, 84 of the split arm assembly 68 are illustrated by example and without limitation as including the respective cut-away indentations 94 and 96 formed at respective rims of the first and second sockets 90, 92. The cut-away indentations 94, 96 form a channel sized to pass the neck 74 supporting part-spherical head 72 of the coupler 70, thus maximizing the range of possible pivotal orientations as indicated by the arrow 66.

Figures 8, 9:
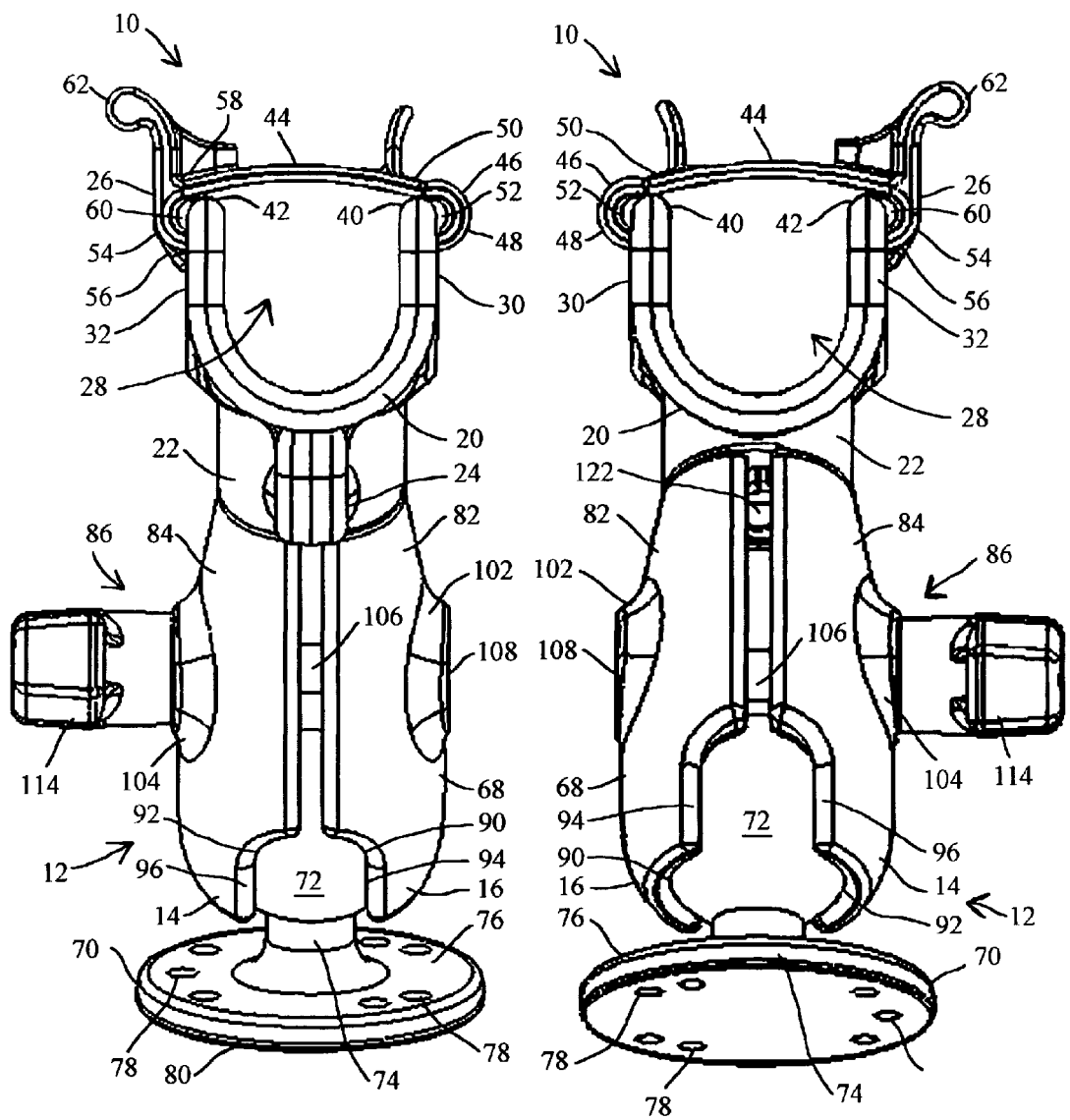
FIG. 8 is a front view of the novel fishing rod holder.
FIG. 9 is a rear view of the novel fishing rod holder.

FIG. 8 and FIG. 9 are views of the fishing rod holder 10 from opposite end directions that illustrated by example and without limitation the longitudinal opening 28 extending in a substantially constant U-shape for the entire length of the elongated semi-tubular barrel 20 between its first and second opposing longitudinal walls 30 and 32.

Figure 10:
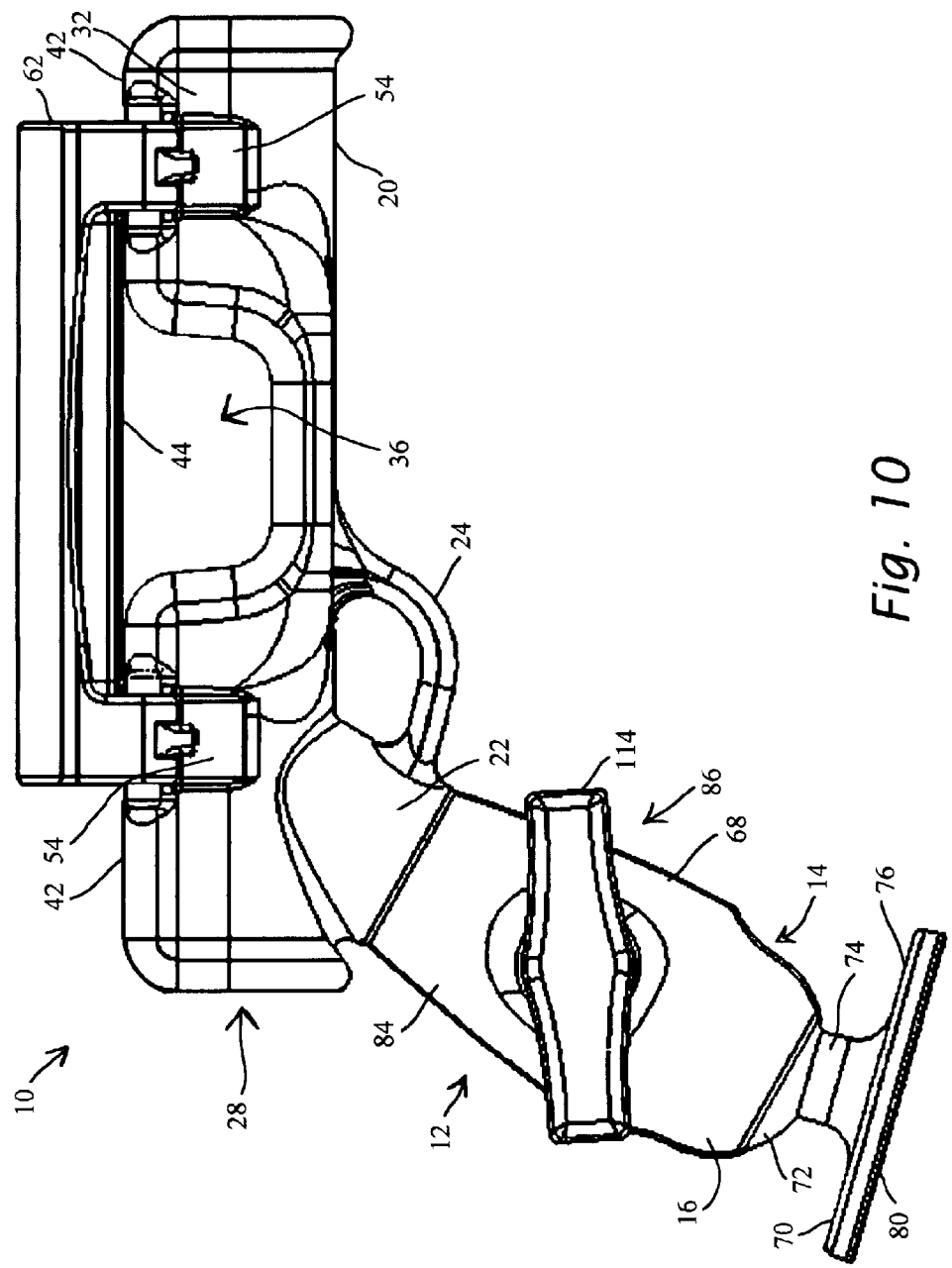
FIG. 10 is a view of the novel fishing rod holder from a first side.
Figure 11:
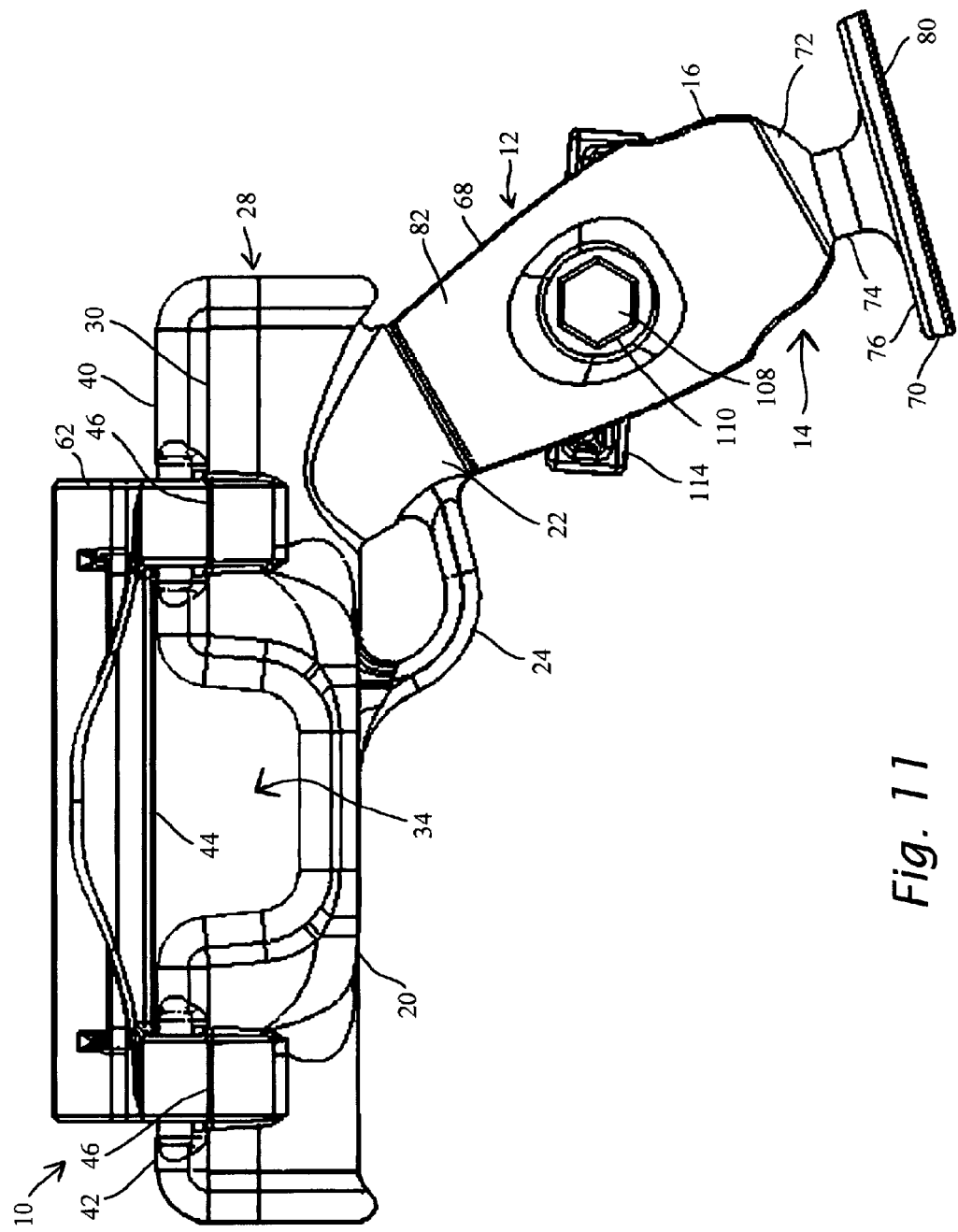
FIG. 11 is a view of the novel fishing rod holder from a second side.

FIG. 10 and FIG. 11 are views of the fishing rod holder 10 from opposite side directions that illustrated by example and without limitation the notches 34 and 36 formed crosswise of the barrel's longitudinal axis 38 and the longitudinal opening 28 through the opposing first and second walls 30 and 32 forming the U-shape of the elongated semi-tubular barrel 20. The notches 34 and 36 accommodate a spinning reel as will be described below.

Figure 12:
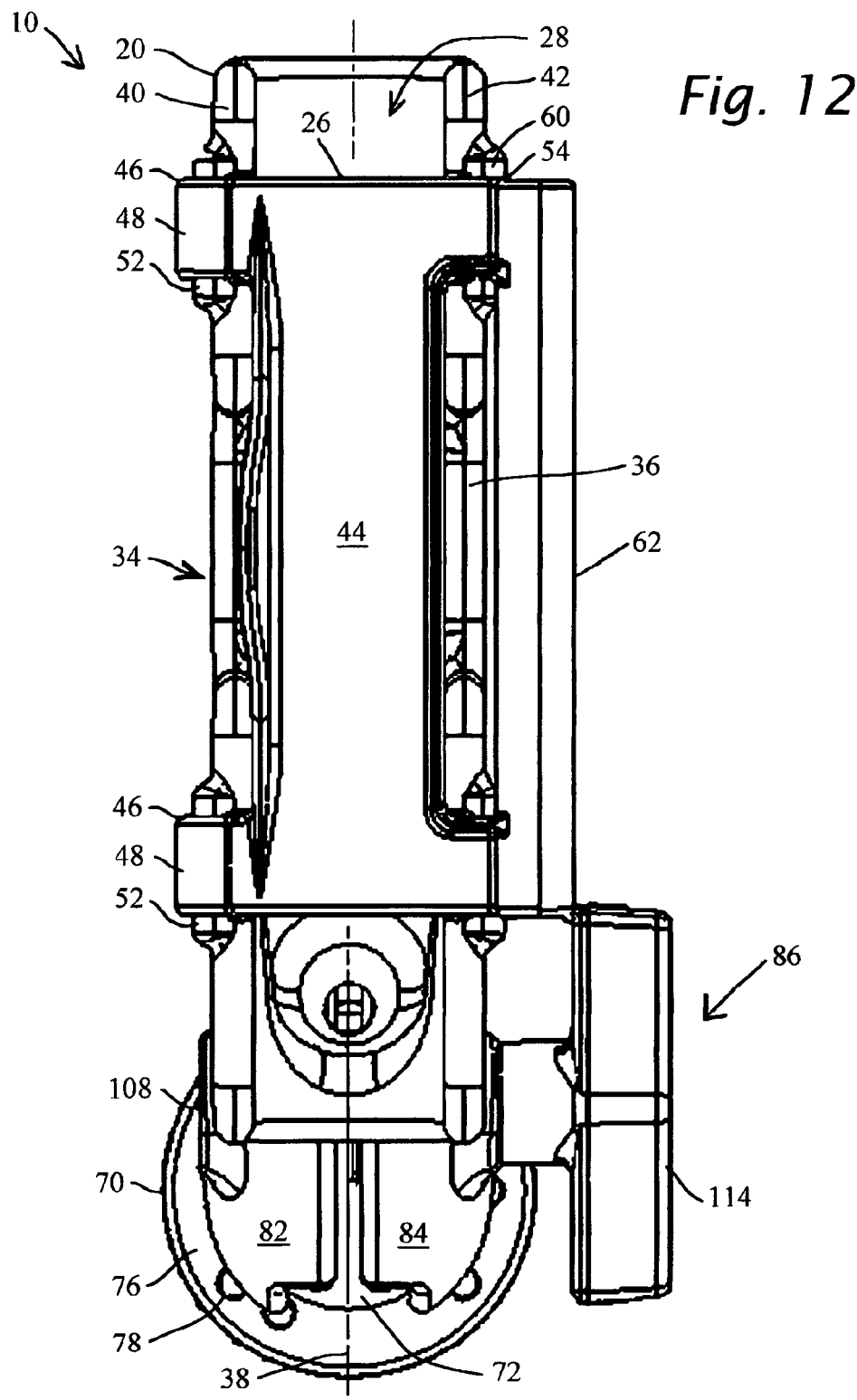
FIG. 12 is a top view of the novel fishing rod holder.

FIG. 12 is a view of the fishing rod holder 10 showing the elongate flexible bail 44 that is rotatably suspended from the first wall 30 of the semi-tubular barrel 20 and swung over substantially the entire length of the barrel's longitudinal opening 28.

Figures 13, 14:
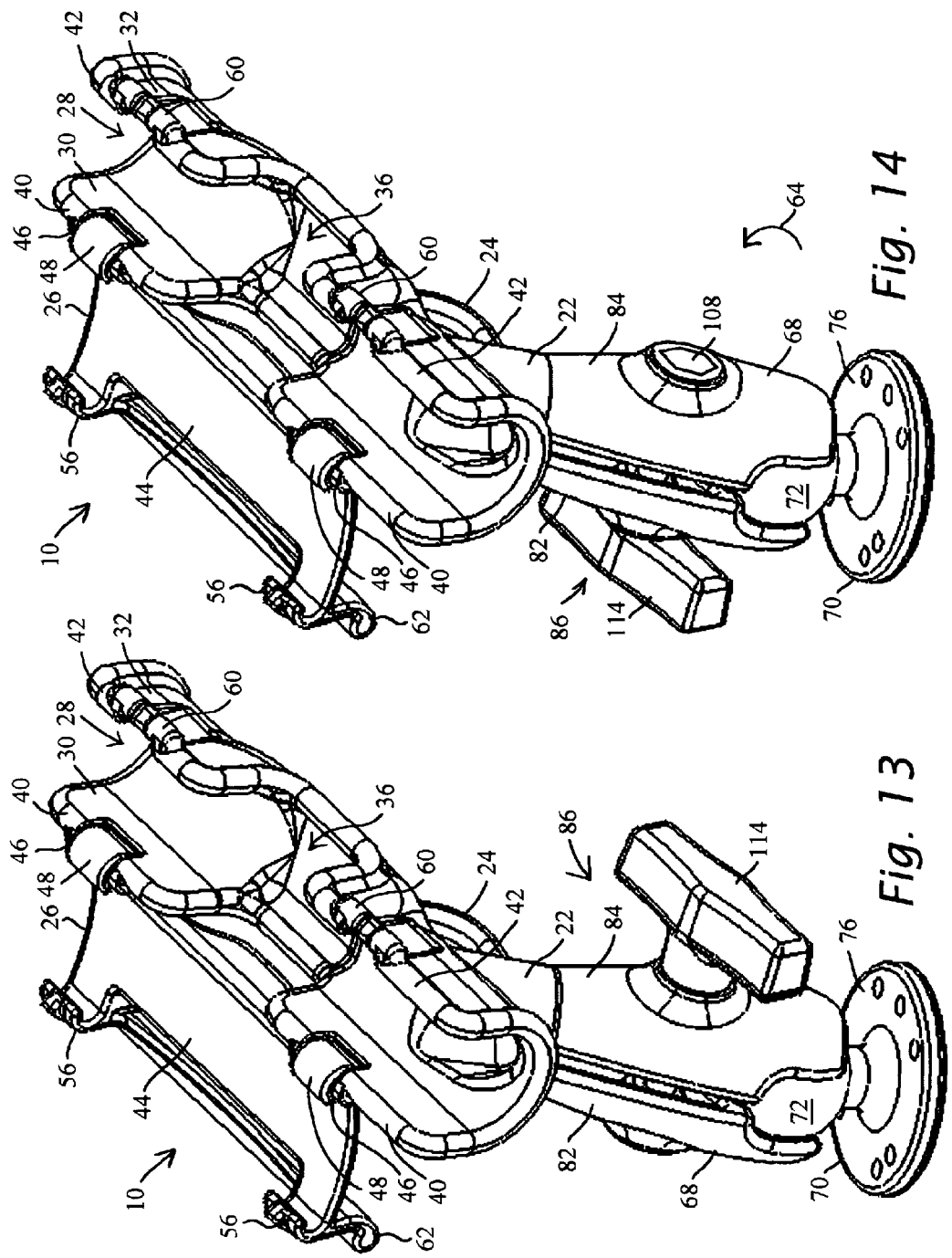
FIG. 13 is a perspective view of the novel fishing rod holder showing a novel semi-tubular barrel thereof rotated in a first direction relative to a knob portion of a clamping mechanism.
FIG. 14 is another perspective view of the novel fishing rod holder showing the novel semi-tubular barrel thereof rotated in a second direction relative to a knob portion of a clamping mechanism opposite from the first direction illustrated in FIG. 13.

FIG. 13 and FIG. 14 are views of the fishing rod holder 10 illustrating the semi-tubular barrel 20 being turned completely around on the substantially smooth, part-spherical head 72 of the ball-end mount or "coupler" 70, as indicated by the arrow 64. Thus, in FIG. 14 the knob 114 of the clamping mechanism 86 is on an opposite side of the barrel 20 from the knob 114 position illustrated in FIG. 13.

Alternatively, FIG. 14 can be interpreted as having the clamping mechanism 86 is on an opposite side of the barrel 20 from the knob 114 position illustrated in FIG. 13 by means of the U-shaped barrel 20 rotated about the pistol grip mounting structure 12 into an opposite one of the discrete rotational orientations relative to the knob 114 of the clamping mechanism 86 when the arm sections 82 and 84 are both formed independently of the U-shaped barrel 20 and having the collars 124 while the end 22 of the U-shaped barrel 20 is formed with the cooperating multisided stem or axle portion 120 and disc-shaped button or wheel portion 122, as discussed in FIG. 3. Thus, the knob 114 is switched to either side of the trigger guard shaped support structure 24 for either left or right hand operation.

According to another alternative, FIG. 14 can be interpreted as having the clamping mechanism 86 is on an opposite side of the barrel 20 from the knob 114 position illustrated in FIG. 13 by means of the bolt 106 being installed instead through the aperture 100 in the second arm section 84, then through the aperture 98 in the first arm section 82 and coupled with the washer 112 and internally threaded knob 114 on the other side of the first arm section 82, as discussed in FIG. 4. The bolt's hexagonal head 108 is mated with the hexagonal counter-bore 134 in the second arm section 84 which retains the bolt 106 against rotation. Accordingly, the clamping mechanism 86 is thus reversed, whereby the structure of the fishing rod holder 10 is thus reversed relative to the trigger guard shaped support structure 24 for either left or right hand operation.

Figure 15:
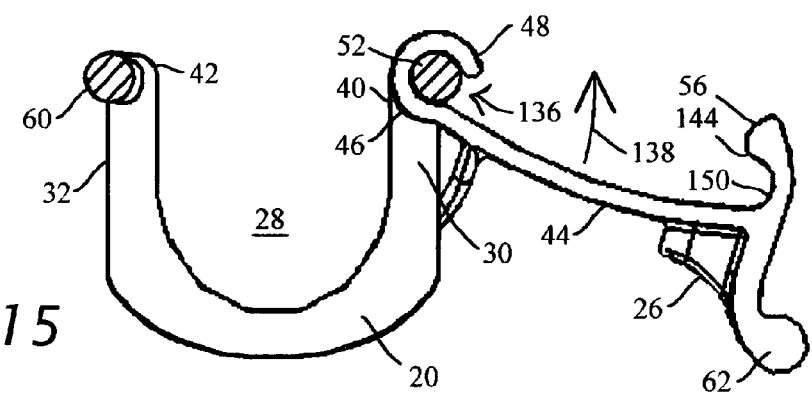
Figure 16:
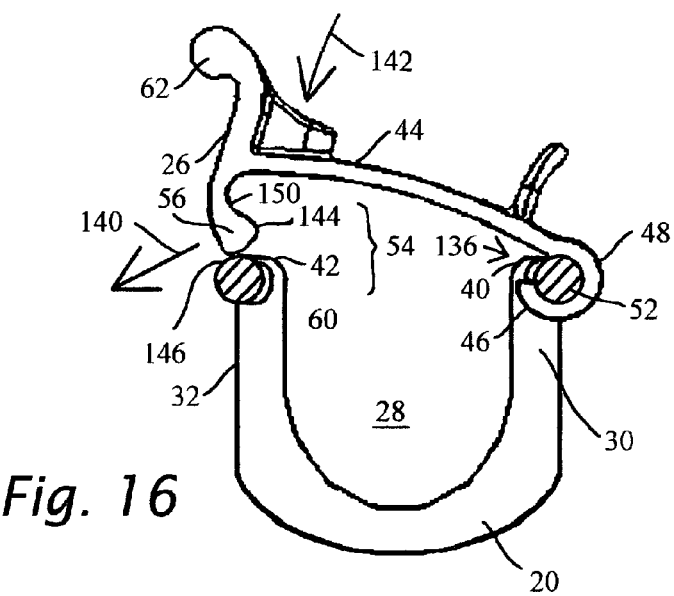
Figure 17:
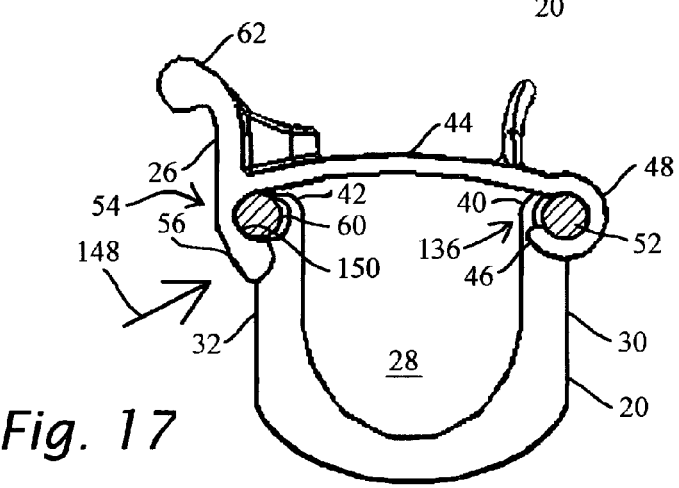

FIG. 15, FIG. 16 and FIG. 17 each illustrate the elongate flexible bail 44 in different positions relative to the semi-tubular barrel 20.

FIG. 15 illustrates the bail 44 being initially rotated on the hinge mechanism 46 to completely uncover the barrel's longitudinal opening 28 along its entire length. In such position, the barrel's longitudinal opening 28 is unobstructed by the bail 44 so that the spinning rod can be inserted into the semi-tubular barrel 20. As indicated by the arrow 138, the bail 44 is rotated on the hooks 48 and hinge pins 52 of the hinge mechanism 46 to an interim position over the barrel's longitudinal opening 28 after the spinning rod is positioned in the semi-tubular barrel 20.

FIG. 16 illustrates the bail 44 being rotated on the hooks 48 and hinge pins 52 of the hinge mechanism 46 from the initial position into the interim position directly over the barrel's longitudinal opening 28. In such position, locking mechanism 54 is positioned to be engaged. By example and without limitation, the curved lips 56 along the bail's catch edge 58 are positioned to engage the respective catch pins 60 protruding from the wall 32 of the semi-tubular barrel 20. During engagement of the locking mechanism 54, the curved lips 56 along the bail's catch edge 58 are forced outwardly, as indicated by arrow 140, by downward engaging force on the handle 62, as indicated by arrow 142. Curved surfaces 144 and 146 on the faces of the curved lips 56 and the catch pins 60, respectively, aid to force the lips 56 outwardly around the catch pins 60, as indicated by arrow 140.

FIG. 17 illustrates the bail 44 being rotated on the hinge mechanism 46 from the interim position into a securely latched position with the locking mechanism 54 being securely engaged. Here, the curved lips 56 along the bail's catch edge 58 are positively engaged with the respective catch pins 60 protruding from the wall 32 of the semi-tubular barrel 20. In such position, the bail 44 is illustrated as being rotated on the hooks 48 and hinge pins 52 of the hinge mechanism 46 into a position that encloses the barrel's longitudinal opening 28. The bail 44 is secured by engagement of the locking mechanism 54 having the curved lips 56 engaged with respective catch pins 60. The flexible nature of the lips 56 cause them to resiliently snap back, as indicated by arrow 148, to their initial shape after being forced outwardly around the respective catch pins 60, as illustrated in FIG. 16. Upon being returned to their initial shape, the curved lips 56 wrap partially around the respective catch pins 60, and the respective catch pins 60 are nested inside complementary curved mouths 150 formed behind the lips 56.

Figure 18:
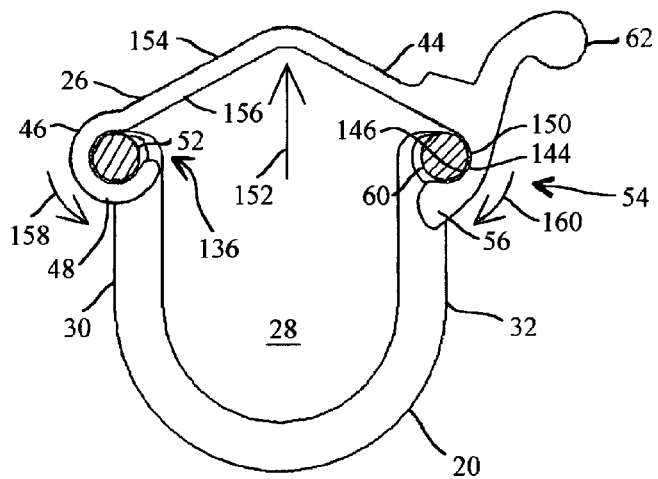
FIG. 18 illustrates operation of the elongate flexible bail in response a lifting force exerted against the bail to pull the spinning rod out of the elongated barrel.

FIG. 18 illustrates operation of the elongate flexible bail 44 in response a lifting force, indicated by arrow 152, exerted against the bail 44 to pull the spinning rod out of the elongated barrel 20. The material of the flexible bail 44 is normally configured in an arched bridge portion 154 thereof forming a gently curved shape between the hinge hooks 48 and curved lips 56, as illustrated by example and without limitation in FIG. 17. The flexible nature of the bail 44 permits the normally gently curved shape of the material in the arched bridge portion 154 between the hinge hooks 48 and curved lips 56 to respond to the lifting force 152 by becoming distorted into a steeper "V" or tent shape with substantially straighter walls 156, as illustrated here. The straightening of the arched bridge portion 154 resulting from the lifting force 152 causes the hinge hooks 48 and curved lips 56 on either end to rotate toward the respective barrel walls 30 and 32, as indicated by respective arrows 158 and 160. The semi-tubular hinge hooks 48 are rotated around the hinge pins 52 to position their respective mouth openings 136 rotated upwardly of the barrel wall 30 away from the longitudinal opening 28 in the barrel 20 holding the spinning reel.

Similarly, the curved lips 56 are rotated around the respective catch pins 60 to position their respective curved mouths openings 150 rotated upwardly of the barrel wall 32 away from the longitudinal opening 28 in the barrel 20. Such resultant rotation of the curved lips 56 relative to the respective catch pins 60 positions the lips' curved mouth openings 150 to even more effectively resist release and more securely contain the spinning reel in the barrel 20.

Figure 19:
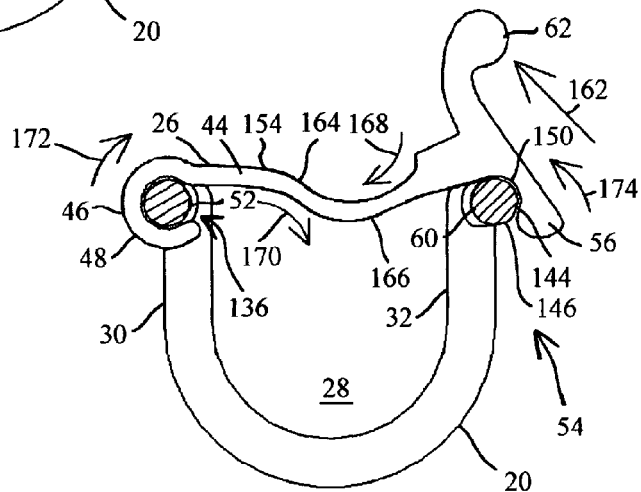
FIG. 19 illustrates a first operation of the elongate flexible bail in response a lifting force exerted on the handle of the spinning rod to release the bail from the elongated barrel wherein a flexible nature of the bail permits the material thereof to become bent into a "S" shape for disengaging the locking mechanism securing the bail relative to the barrel.

FIG. 19 illustrates operation of the elongate flexible bail 44 in response a lifting force, indicated by arrow 162, exerted on the handle 62 to release the bail 44 from the elongated barrel 20. The flexible nature of the bail 44 permits the normally gently curved shape of the material of the arched bridge portion 154 between the hinge hooks 48 and curved lips 56 to become bent into a "S" shape with substantially inversely curved wall portions 164 and 166, as indicated by respective arrows 168 and 170.

The S-bending of the arched bridge portion 154 resulting from the lifting force 162 on the handle 62 disengages the locking mechanism 54 and releases the bail 44 from the barrel 20. By example and without limitation, the S-bending of the arched bridge portion 154 resulting from the lifting force 162 on the handle 62 causes the hinge hooks 48 and curved lips 56 on either end to rotate away from the respective barrel walls 30 and 32, as indicated by respective arrows 172 and 174. The semi-tubular hinge hooks 48 are rotated around the hinge pins 52 to position their respective mouth openings 136 rotated downwardly of the barrel wall 30 toward from the longitudinal opening 28 in the barrel 20 holding the spinning reel.

Similarly, the curved lips 56 are rotated around the respective catch pins 60 to position their respective curved mouths openings 150 rotated upwardly of the barrel wall 32 to clear the respective catch pins 60. Such resultant rotation of the curved lips 56 positions the lips' curved mouths openings 150 generally over the respective catch pins 60 and facing toward the barrel 20 holding the spinning reel. In such position, the flexible nature of the lips 56 permit their respective mouths 150 to be opened sufficiently to release the respective catch pins 60 and open the bail 44, whereupon the spinning reel may be released from the barrel 20 of the fishing rod holder 10.

The actual change in configuration of the bridge portion 154 that permits release of the lips 56 from the respective catch pins 60 and opening of the bail 44 is a function of the mechanical properties of the material selected for use in manufacturing the bail 44 as well as the physical dimensions of the bail 44. Therefore, because materials and physical dimensions of the bail 44 may be selected to differ, the actual operation of the bail's bridge portion 154 and lips 56 during release of the catch pins 60 may vary without departing from the spirit and scope of the invention.

Figure 20:
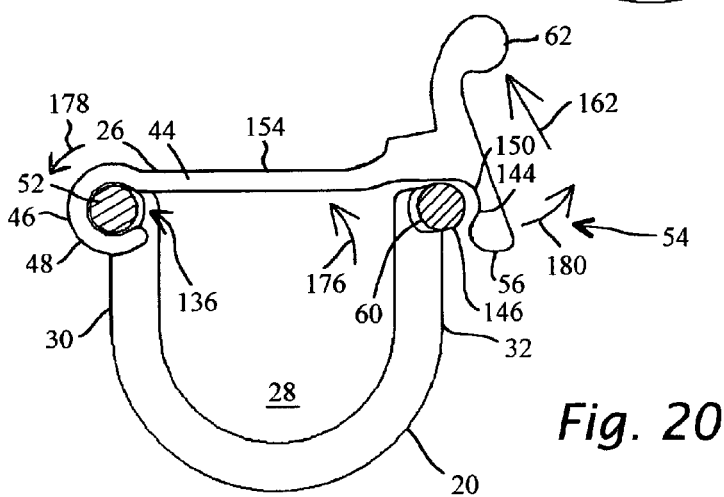
FIG. 20 illustrates by example and without limitation another operation of the elongate flexible bail in response a lifting force exerted on the handle of the spinning rod to release the bail from the elongated barrel wherein a flexible nature of the bail permits the material thereof to substantially straighten for disengaging the locking mechanism securing the bail relative to the barrel.

FIG. 20 illustrates by example and without limitation another operation of the elongate flexible bail 44 in response the lifting force, indicated by arrow 162, exerted on the handle 62 to release the bail 44 from the elongated barrel 20. Here, the flexible nature of the bail 44 permits the normally gently curved shape of the material of the arched bridge portion 154 between the hinge hooks 48 and curved lips 56 to substantially straighten, as indicated by arrow 176.

Straightening of the arched bridge portion 154 resulting from the lifting force 162 on the handle 62 disengages the locking mechanism 54 and releases the bail 44 from the barrel 20. By example and without limitation, the straightening of the arched bridge portion 154 resulting from the lifting force 162 on the handle 62 causes the hinge hooks 48 on either end of the bail 44 to rotate away from the barrel wall 32, as indicated by arrow 178. The curved lips 56 are spread away from the barrel wall 32 and the respective catch pins 60, as indicated by the arrow 180, to position their respective curved mouths openings 150 to clear the respective catch pins 60. In such spaced-away position, the flexible nature of the lips 56 permit their respective mouths 150 to be opened sufficiently to release the respective catch pins 60 and open the bail 44, whereupon the spinning reel may be released from the barrel 20 of the fishing rod holder 10.

Figure 21:
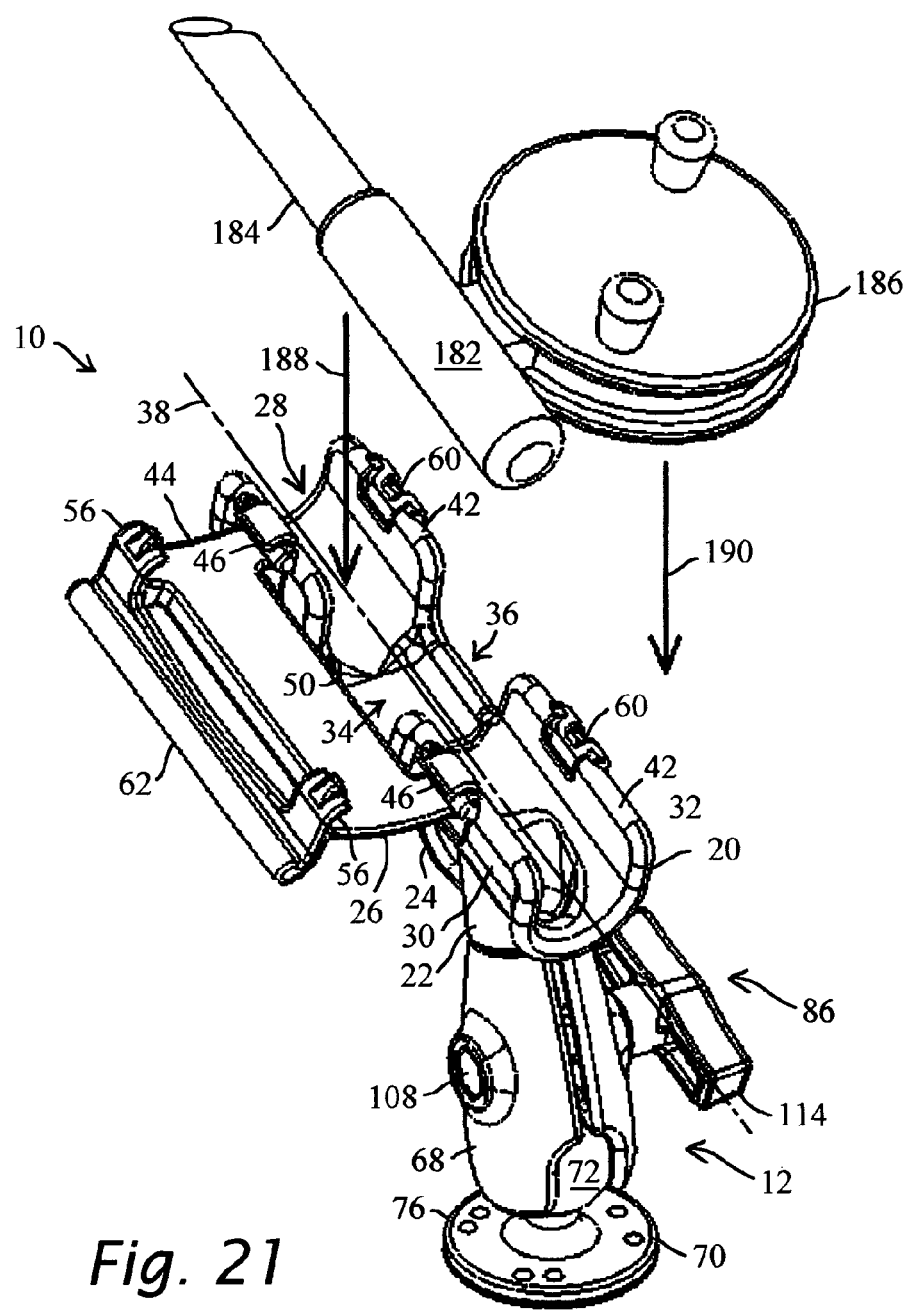
FIG. 21 illustrates by example and without limitation the novel fishing rod holder with the bail being initially rotated to completely uncover the barrel's longitudinal opening such that the barrel's longitudinal opening is unobstructed and a spinning rod can be inserted into the semi-tubular barrel.

FIG. 21 illustrates by example and without limitation the fishing rod holder 10 with the bail 44 being initially rotated on the hinge mechanism 46 to completely uncover the barrel's longitudinal opening 28 along its entire length. As discussed herein, with the bail 44 in such position the barrel's longitudinal opening 28 is unobstructed so that a handle 182 of a spinning rod 184 can be inserted into the semi-tubular barrel 20. As illustrated here, the spinning rod handle 182 is initially positioned over the barrel's longitudinal opening 28 and substantially aligned with the longitudinal axis 38 of the semi-tubular barrel 20. A spinning reel 186 attached to the spinning rod handle 182 is initially substantially aligned with the second notch 36 formed crosswise of the barrel's longitudinal axis 38 through its second wall 32 opposite from the hinged edge 50 of the currently open security bail 44. As discussed above, both the first and second notches 34 and 36 are structured to accommodate the spinning reel 186. Here, the spinning reel 186 is aligned with the second notch 36 in the second wall 32 of the barrel 20 because it is open, while the hinged edge 50 of the security bail 44 effectively blocks access to the first notch 34 in the barrel wall 30 by engagement of the bail's pair of semi-tubular hooks 48 with the hinge pins 52 on either side of the wall notch 34. From such initial position and orientation the spinning rod handle 182 is inserted into the longitudinal opening 28 of the semi-tubular barrel 20, as indicated by arrow 188, and the spinning reel 186 is substantially simultaneously fit into the notch 36 in the second wall 32 of the barrel 20, as indicated arrow 190.

Alternatively, during insertion of the spinning rod handle 182 into the longitudinal opening 28 of the semi-tubular barrel 20, the spinning reel 186 is initially oriented anywhere within the spatial hemisphere above the spinning rod 184 facing away from the longitudinal opening 28 of the fishing rod holder's semi-tubular barrel 20. After insertion into the barrel's longitudinal opening 28, the spinning rod 184 is rotated to bring the spinning reel 186 into the open second notch 36.

Figure 22:
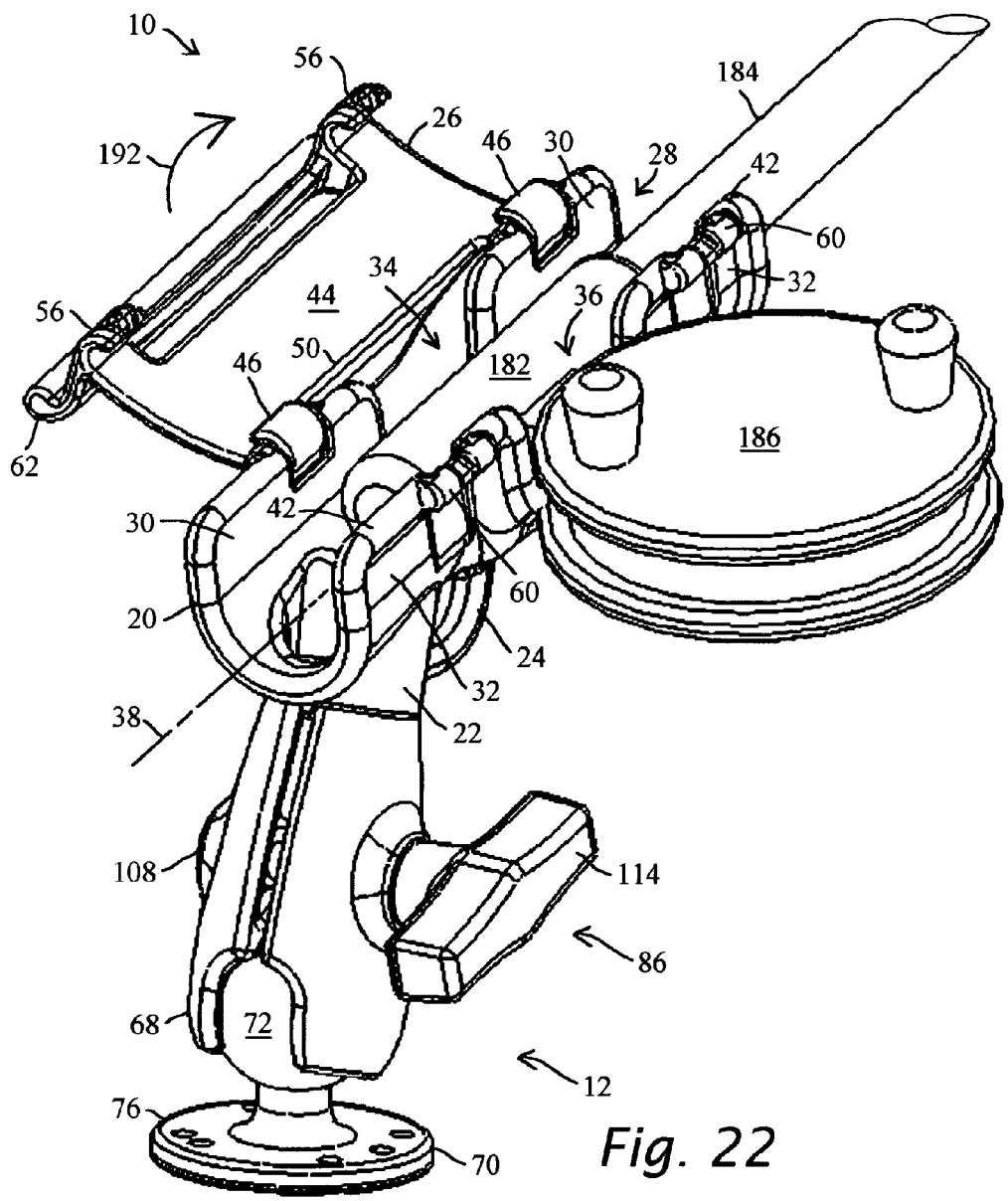
FIG. 22 illustrates the novel fishing rod holder having the spinning rod inserted into the longitudinal opening of the semi-tubular barrel with its spinning reel inserted into an open notch in the barrel wall opposite from the hinged security bail.

FIG. 22 illustrates the fishing rod holder 10 having the handle 182 of the spinning rod 184 inserted into the longitudinal opening 28 of the semi-tubular barrel 20 with the spinning reel 186 inserted into the open wall notch 34 opposite from the hinge mechanism 46 suspending the security bail 44. With the spinning rod handle 182 and reel 186 being so installed, the hinged security bail 44 is subsequently rotated on the hinge mechanism 46, as indicated by arrow 192, to bring it over the barrel's longitudinal opening 28 and engage the locking mechanism 54 by bringing the pair of curved lips 56 into engagement with respective catch pins 60 protruding from the opposite barrel wall 32 on either side of the wall notch 36 holding the spinning reel 186.

Figure 23:
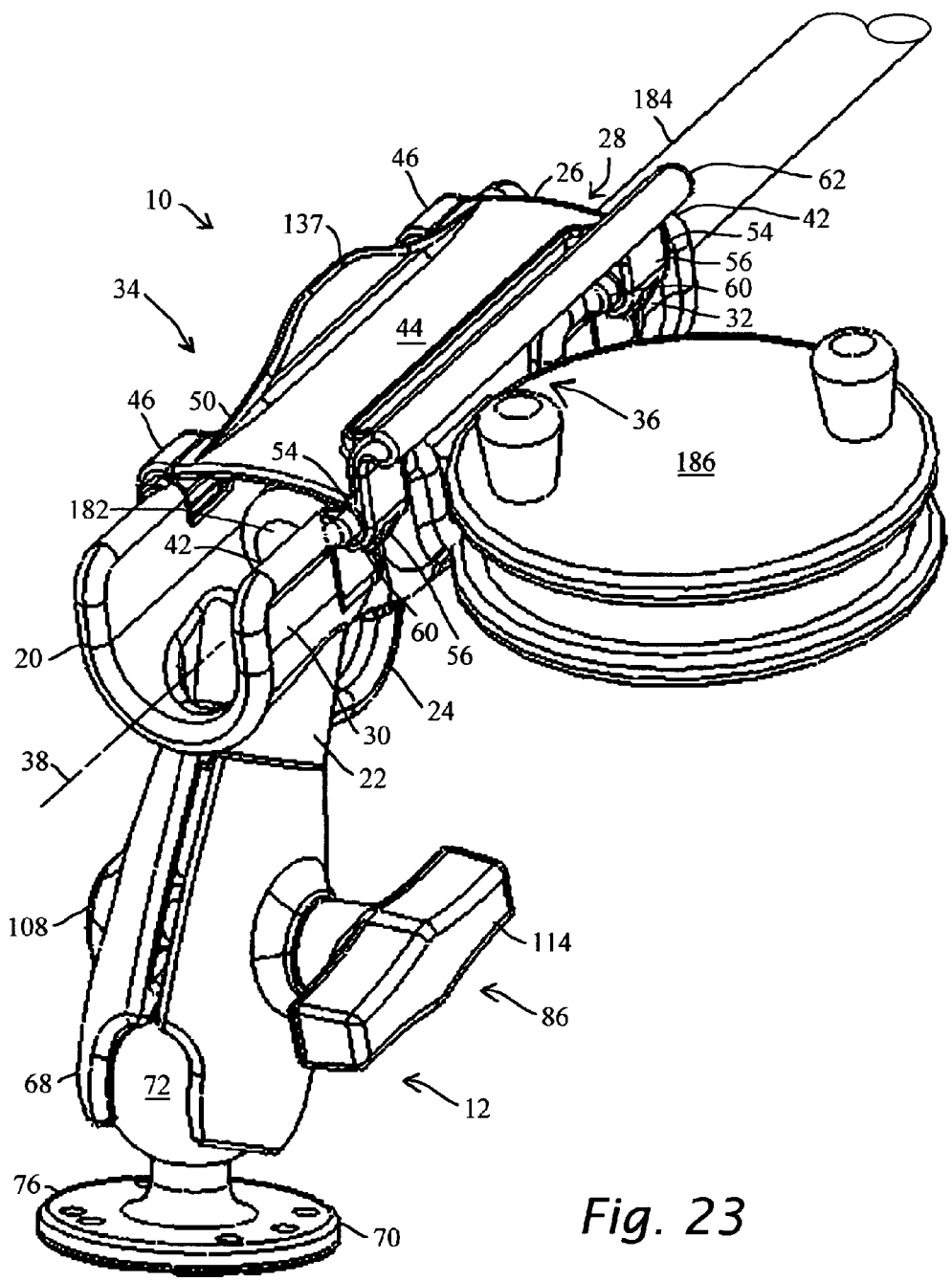
FIG. 23 illustrates the novel fishing rod holder having the spinning rod inserted into the longitudinal opening of the semi-tubular barrel with the spinning reel inserted into the wall notch wherein the hinged security bail is shown rotated into position over the barrel's longitudinal opening with the locking mechanism securely engaged such that the security bail effectively secures the spinning rod against removal from the barrel of the rod holder even against a substantial lifting force exerted against the bail to pull the spinning rod out.

FIG. 23 illustrates the fishing rod holder 10 having the handle 182 of the spinning rod 184 inserted into the longitudinal opening 28 of the semi-tubular barrel 20 with the spinning reel 186 inserted into the wall notch 34. The hinged security bail 44 is shown rotated into position over the barrel's longitudinal opening 28 with the pair of curved lips 56 of the locking mechanism 54 securely engaged with respective catch pins 60 protruding from the opposite barrel wall 32 on either side of the wall notch 36 holding the spinning reel 186. In such position with the pair of curved lips 56 securely engaged with respective catch pins 60, the security bail 44 effectively secures the spinning rod handle 182 against removal from the barrel 20 of the rod holder 10 even against a substantial lifting force exerted against the bail 44 to pull the spinning rod out, as indicated by arrow 152 in FIG. 18.

Figure 24:
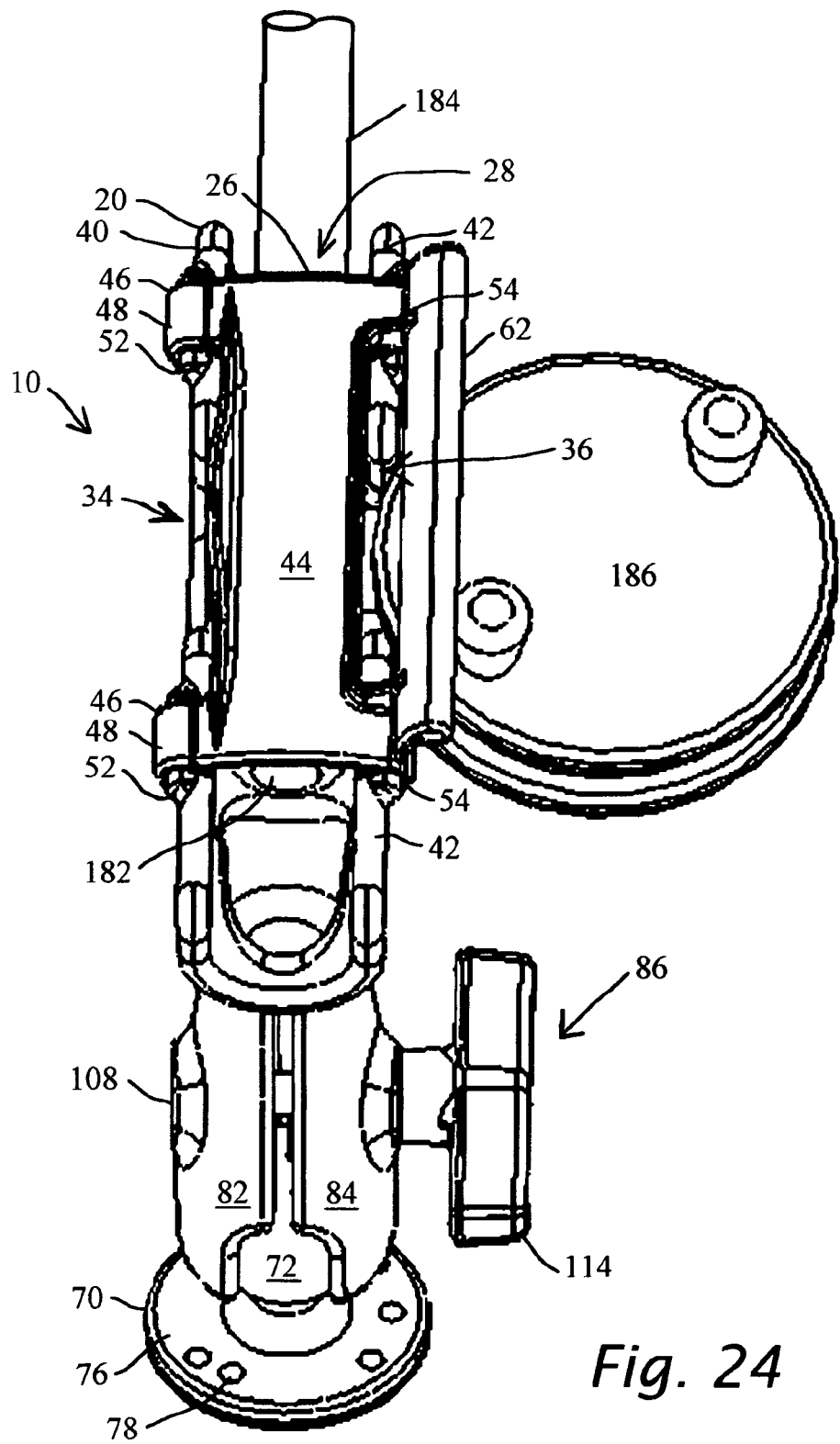
FIG. 24 is another view that illustrates the novel fishing rod holder having the spinning rod secured within the longitudinal opening of the semi-tubular barrel with the spinning reel secured within the wall notch by the security bail.

FIG. 24 is another view that illustrates the fishing rod holder 10 having the handle 182 of the spinning rod 184 secured within the longitudinal opening 28 of the semi-tubular barrel 20 with the spinning reel 186 secured within the wall notch 34 by the security bail 44.

Figure 25:
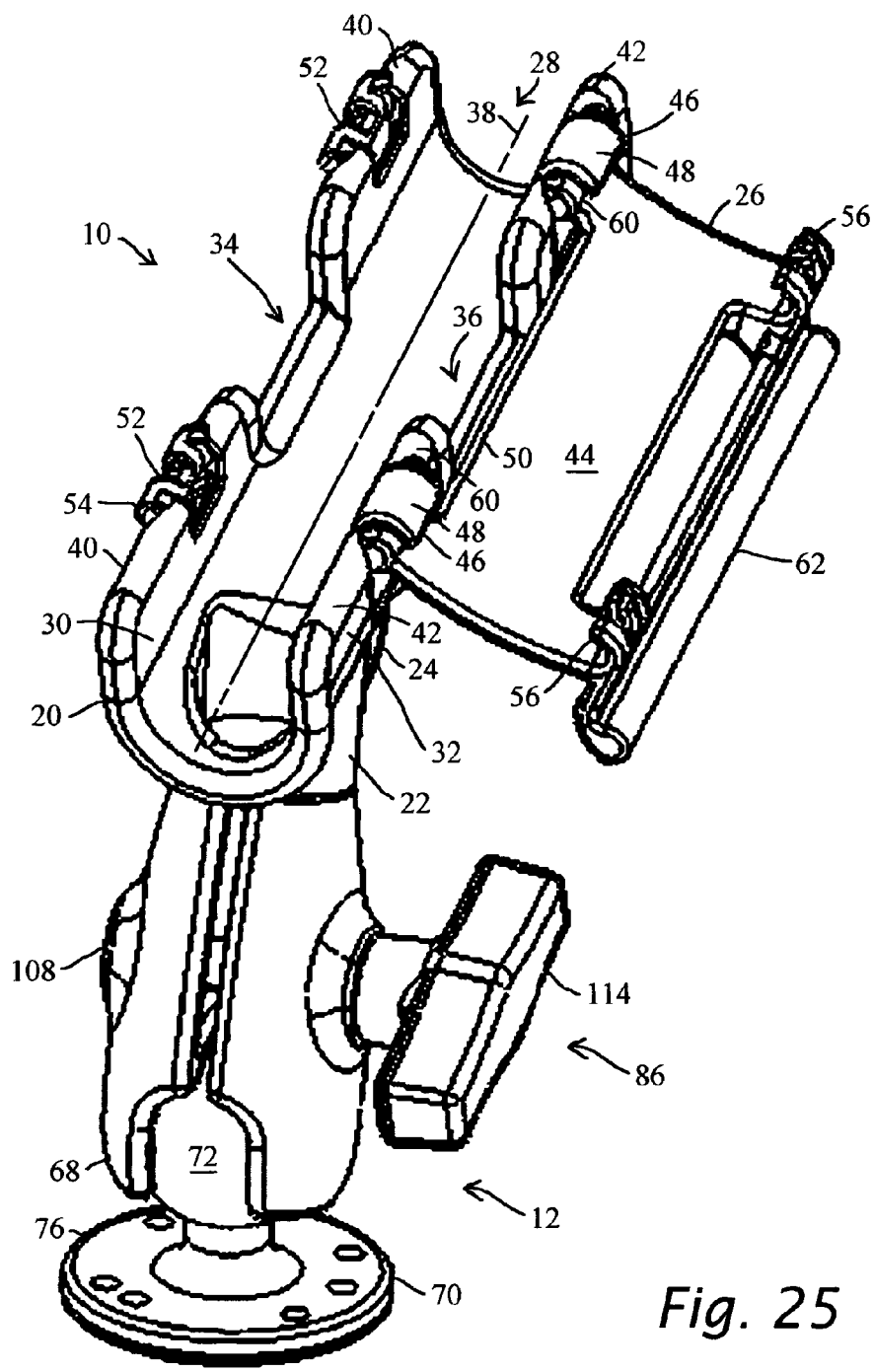
FIG. 25 illustrates the novel fishing rod holder's quick release latch having the security bail in a reversed position on the semi-tubular barrel, which illustrates reversible structure of the novel fishing rod holder.

FIG. 25 illustrates the fishing rod holder's quick release latch 26 having the flexible security bail 44 in the reversed position on the semi-tubular barrel 20. As discussed herein, the locking mechanism 54 and hinge mechanism 46 both also being structured to be reversible. The catch pins 60 spaced on either side of the second notch 36 in the second wall 32 of the semi-tubular barrel 20 are substantially identical to the pair of hinge pins 52 spaced on either side of the first notch 34 in the first barrel wall 30.

Here, the pair of semi-tubular hooks 48 of the flexible bail 44 spaced apart along the bail's hinge edge 50 are shown as hooked over the pair of integral catch pins 60 rather than the substantially identical hinge pins 52. Thus, the catch pins 60 are substituted for the hinge pins 52 in the reversed hinge mechanism 46 for rotatably suspending the bail 44 from the second barrel wall 32 and swinging the bail 44 over the longitudinal opening 28 of the semi-tubular barrel 20 from a second or right side of the fishing rod holder 10. The bail 44 is secured by engagement of the reversed locking mechanism 54, whereby the curved lips 56 are engaged instead with the hinge pins 52 protruding from the first barrel wall 30, the substantially identical hinge pins 52 thereafter operating as substitutes for the catch pins 60. The fishing rod holder 10 is thus structured to be reversible.

FIG. 26 illustrates the reversed fishing rod holder 10 having the security bail 44 being reversed as well as both the locking mechanism 54 and hinge mechanism 46 also being reversed. As discussed herein, the hinge pins 52 on the first wall 30 of the semi-tubular barrel 20 are substantially identical to the catch pins 60 protruding from the opposing barrel wall 32 in size, shape and placement relative to the opposing crosswise wall notches 34, 36. Accordingly, as illustrated here the hinge mechanism 46 is reversed, wherein the hooks 48 along the hinge edge 50 of the security bail 44 are installed onto the catch pins 60, which operate as substitutes for the hinge pins 52. Thus, as illustrated here the security bail 44 is suspended instead from the second wall 32 of the semi-tubular barrel 20 for swinging over the barrel's longitudinal opening 28 from the second or right side of the fishing rod holder 10. The bail 44 is secured by the reversed locking mechanism 54, wherein the curved lips 56 are engaged with the substantially identical hinge pins 52 protruding from the first barrel wall 30, which operate as substitutes for the catch pins 60. The fishing rod holder 10 is thus structured to be reversible.

Here, the fishing rod holder 10 is illustrated by example and without limitation with the bail 44 being initially rotated on the hooks 48 and catch pins 60 (substituting for hinge pins 52) to completely uncover the barrel's longitudinal opening 28 along its entire length. As discussed herein, with the security bail 44 in such position the barrel's longitudinal opening 28 is unobstructed so that the handle 182 of the spinning rod 184 can be inserted into the semi-tubular barrel 20. As illustrated here, the spinning rod handle 182 is initially positioned over the barrel's longitudinal opening 28 and substantially aligned with the longitudinal axis 38 of the semi-tubular barrel 20. The spinning reel 186 attached to the spinning rod handle 182 is initially substantially aligned with the first notch 34 formed crosswise of the barrel's longitudinal axis 38 through its first wall 30 opposite from the hinged edge 50 of the currently open security bail 44. As discussed above, both the first and second notches 34 and 36 are structured to accommodate the spinning reel 186. Here, the spinning reel 186 is aligned with the first notch 34 in the first wall 30 of the barrel 20 because it is open, while the hinged edge 50 of the security bail 44 now effectively blocks access to the second notch 36 in the barrel wall 32 by engagement of the bail's pair of semi-tubular hooks 48 with the catch pins 60 on either side of the wall notch 36. From such initial position and orientation the handle 182 of the spinning rod 184 is inserted into the longitudinal opening 28 of the semi-tubular barrel 20, as indicated by arrow 194, and the spinning reel 186 is substantially simultaneously fit into the first notch 34 in the first wall 30 of the barrel 20, as indicated arrow 196.

Alternatively, during insertion of the handle 182 of the spinning rod 184 into the longitudinal opening 28 of the semi-tubular barrel 20, the spinning reel 186 is initially oriented anywhere within the spatial hemisphere above the spinning rod handle 182 facing away from the longitudinal opening 28 of the fishing rod holder's semi-tubular barrel 20. After insertion into the barrel's longitudinal opening 28, the spinning rod handle 182 is rotated to bring the spinning reel 186 into the open first notch 34.

FIG. 27 illustrates the reversed fishing rod holder 10 having the handle 182 of the spinning rod 184 inserted into the longitudinal opening 28 of the semi-tubular barrel 20. The spinning reel 186 inserted into the open wall notch 36 opposite from the hinged security bail 44. With the spinning rod handle 182 and reel 186 being so installed, the reversely hinged security bail 44 is subsequently rotated, as indicated by arrow 198, by the pair of semi-tubular hooks 48 on the respective catch pins 60 (substituting for hinge pins 52) to bring it over the barrel's longitudinal opening 28 and bring the pair of curved lips 56 along the catch edge 58 thereof into engagement with respective hinge pins 52 (substituting for catch pins 60) protruding from the opposite barrel wall 30 on either side of the wall notch 34 holding the spinning reel 186.

FIG. 28 illustrates the reversed fishing rod holder 10 having the handle 182 of the spinning rod 184 inserted into the longitudinal opening 28 of the semi-tubular barrel 20 with the spinning reel 186 inserted into the wall notch 36. The hinged security bail 44 is shown rotated into position over the barrel's longitudinal opening 28 with the pair of curved lips 56 thereof securely engaged with respective hinge pins 52 (substituting for catch pins 60) protruding from the opposite barrel wall 30 on either side of the wall notch 34 now holding the spinning reel 186. In such position with the pair of curved lips 56 securely engaged with respective hinge pins 52 (substituting for catch pins 60), the reversed security bail 44 effectively secures the spinning rod handle 182 against removal from the barrel 20 of the rod holder 10 even against a substantial lifting force exerted against the bail 44 to pull the spinning rod out, as indicated by arrow 152 in FIG. 18.

While the preferred embodiment of the invention has been illustrated and described, it will be appreciated that various changes can be made therein without departing from the spirit and scope of the invention.

What is claimed is:

1. A fishing rod holder device, comprising:
  a semi-tubular barrel having a longitudinal opening between a pair of opposing longitudinal walls, each of the opposing longitudinal walls having a notch formed through an outer edge thereof;
  a bail structured to fit over the longitudinal opening between the pair of opposing longitudinal walls of the semi-tubular barrel;
  a first portion of a hinge mechanism structured adjacent to the outer edge of each one of the opposing longitudinal walls of the semi-tubular barrel;
  a second portion of the hinge mechanism structured adjacent to an outer edge of the bale, the second portion of the hinge mechanism being structured for cooperating with the first portion thereof on either of the opposing longitudinal walls of the semi-tubular barrel for swinging the bail over the longitudinal opening thereof; and
  wherein the hinge mechanism further comprises a pair of hooks spaced apart along an edge of the bail, the pair of hooks being structured to releasably engage a pair of hinge pins on the outer edge of the barrel's first longitudinal wall and spaced on either side of the wall notch thereof.

2. The device of claim 1 further comprising a locking mechanism structured between the bail and the outer edge of each of the opposing longitudinal walls for securing the bail relative to the semi-tubular barrel, whereby the bail is reversible relative to the outer edges of the opposing longitudinal walls.

3. The device of claim 2 wherein the locking mechanism further comprises a pair of lips spaced apart along an edge of the bail, the pair of lips being structured to releasably engage a pair of catch pins on the outer edge of the barrel's second longitudinal wall and spaced on either side of the wall notch thereof.

4. The device of claim 3 wherein the pair of catch pins on the outer edge of the barrel's second longitudinal wall are further substantially identical to the pair of hinge pins on the outer edge of the barrel's first longitudinal wall.

5. The device of claim 4, further comprising a mounting structure having a ball-and-socket joint at a first end thereof and a second end thereof being joined to the semi-tubular barrel.

6. The device of claim 5, further comprising a support structure coupled between the mounting structure and the semi-tubular barrel.

7. The device of claim 6 wherein the mounting structure is further structured as a hand grip, and the support structure is further structured to admit a digit between the mounting structure and the semi-tubular barrel.

8. The device of claim 1, further comprising a locking mechanism structured between the bail and the outer edge of at least one of the opposing longitudinal walls for securing the bail relative to the semi-tubular barrel.

9. A fishing rod holder device, comprising:
  a pistol grip mounting structure having a ball-and-socket joint at a first end thereof;
  a semi-tubular U-shaped barrel projected from a second end of the mounting structure opposite from the ball-and-socket joint, the semi-tubular U-shaped barrel being formed with a longitudinal opening between a pair of opposing longitudinal walls thereof and opposing notches formed crosswise of the longitudinal opening through opposing outer edges of the longitudinal walls;

a bail structured for being alternatively rotatably suspended from each of a first and a second of the opposing longitudinal walls of the semi-tubular barrel for swinging over the longitudinal opening thereof, the bail being alternately moveable between a first position rotatably suspended from the first opposing longitudinal wall and a second position rotatably suspended from the second opposing longitudinal wall; and an over-center locking mechanism operable between the bail the outer edge of at least one of the opposing longitudinal walls, wherein the over-center locking mechanism further comprises a lip formed on the bail and structured to engage a complementary portion of the outer edge of the first one of the opposing longitudinal walls external of the longitudinal opening between the pair of opposing longitudinal walls.

10. The device of claim 9, further comprising a support structure extended between the pistol grip mounting structure and the semi-tubular barrel.

11. The device of claim 10 wherein the support structure extended between the pistol grip mounting structure and the semi-tubular barrel further comprises a trigger guard shaped support structure sized to admit a digit between the pistol grip mounting structure and the semi-tubular barrel.

12. The device of claim 9 wherein the bail is further rotatably suspended from the semi-tubular barrel adjacent to the outer edge of a second one of the opposing longitudinal walls thereof.

13. The device of claim 12 wherein the semi-tubular barrel further comprises a hinge pin adjacent to the outer edge of the second one of the opposing longitudinal walls thereof; and
    the bail further comprises a semi-tubular hook structured to fit over the hinge pin.

14. The device of claim 13 wherein the complementary portion of the outer edge of the first one of the opposing longitudinal walls engaged by the lip formed on the bail further comprises a catch pin that is substantially identical to the hinge pin.

15. The device of claim 14 wherein the semi-tubular barrel further comprises:
    at least two of the hinge pins each adjacent to the outer edge of the second one of the pair of opposing longitudinal walls thereof, the hinge pins being spaced on opposite sides of the crosswise notch, and
    at least two of the catch pins each adjacent to the outer edge of the first one of the pair of opposing longitudinal walls thereof, the catch pins being spaced on opposite sides of the crosswise notch; and
    the bail further comprises:
        at least two of the semi-tubular hooks each being structured to fit over one of the hinge pins, the semi-tubular hooks being spaced in complementary positions relative to the hinge pins, and
        at least two of the lips each being structured to engage one of the catch pins, the lips being spaced in complementary positions relative to the catch pins.

16. A fishing rod holder device, comprising:
    a pistol grip mounting structure formed of a pair of arm sections having an interlockable ball-and-socket joint at a first end thereof, a clamping mechanism structured for squeezing together the pair of arm sections, and;
    an elongated semi-tubular U-shaped barrel coupled to a second end of the mounting structure opposite from the ball-and-socket joint, the elongated semi-tubular U-shaped barrel forming a longitudinal opening between a pair of opposing longitudinal walls each having a notch formed through an outer edge thereof substantially intermediate of the semi-tubular barrel and being structured to accommodate a spinning reel;
    an integral support structure joined between the pistol grip mounting structure and the semi-tubular barrel; and
    a substantially thin and flexible elongated bail having a first edge thereof rotatably suspended from the outer edge of one of the pair of opposing longitudinal walls of the semi-tubular barrel for swinging over the longitudinal opening thereof and a second edge thereof having a flexible lip structured to engage a catch adjacent to the outer edge of an other one of the pair of opposing longitudinal walls for securing the bail relative to the semi-tubular barrel;
    wherein the one of the longitudinal walls having the bail rotatably suspended therefrom further comprises a hinge pin adjacent to the outer edge thereof;
    wherein the bail further comprises a semi-tubular hook rotatably coupled to the hinge pin; and
    wherein the catch further comprises a catch pin that is substantially identical to the hinge pin in size, shape and position relative to the respective wall notches.

17. The device of claim 16 wherein the flexible lip is further structured to engage the catch in an over-center fashion.

18. The device of claim 17 wherein the support structure between the pistol grip mounting structure and the semi-tubular barrel further comprises a trigger guard shaped support structure.

19. The device of claim 16 wherein the semi-tubular barrel further comprises at least two of the hinge pins and at least two of the catch pins spaced on opposite sides of the respective notch; and
    the bail further comprises at least two of the semi-tubular hooks and at least two of the curved lips positioned to engage the hinge pins and catch pins, respectively.

20. A fishing rod holder device, comprising:
    a semi-tubular barrel having a longitudinal opening between a pair of opposing longitudinal walls, each of the opposing longitudinal walls having a notch formed through an outer edge thereof;
    a bail structured to fit over the longitudinal opening between the pair of opposing longitudinal walls of the semi-tubular barrel;
    a pair of hinge mechanisms structured between the bail and the outer edge of a first one of the opposing longitudinal walls of the semi-tubular barrel for swinging the bail over the longitudinal opening thereof, wherein each of the hinge mechanisms are spaced apart along the outer edge of the barrel's first longitudinal wall and spaced on either side of the wall notch thereof, and each of the hinge mechanisms further comprises a pair of hooks structured to releasably engage a pair of hinge pins between the outer edge of the barrel's first longitudinal wall and the bail.

21. The device of claim 20, further comprising a locking mechanism structured between the bail and the outer edge of a second one of the opposing longitudinal walls for securing the bail relative to the semi-tubular barrel.

22. A fishing rod holder device, comprising:
    a pistol grip mounting structure having a ball-and-socket joint at a first end thereof;
    a semi-tubular U-shaped barrel projected from a second end of the mounting structure opposite from the ball-and-socket joint, the semi-tubular U-shaped barrel being formed with a longitudinal opening between a pair of opposing longitudinal walls thereof and opposing notches formed crosswise of the longitudinal opening through opposing outer edges of the longitudinal walls;

a bail rotatably suspended from the semi-tubular barrel for swinging over the longitudinal opening thereof; and an over-center locking mechanism operable between the bail the outer edge of a first one of the opposing longitudinal walls; and wherein the semi-tubular barrel further comprises a hinge pin adjacent to the outer edge of the second one of the opposing longitudinal walls thereof; and the bail further comprises a semi-tubular hook structured to fit over the hinge pin.

* * * * *